US012185081B2

(12) United States Patent
Vilkamo et al.

(10) Patent No.: US 12,185,081 B2
(45) Date of Patent: Dec. 31, 2024

(54) AUDIO RENDERING WITH SPATIAL METADATA INTERPOLATION

(71) Applicant: Nokia Technologies Oy, Espoo (FI)

(72) Inventors: Juha Vilkamo, Helsinki (FI); Mikko-Ville Laitinen, Espoo (FI); Archontis Politis, Tampere (FJ)

(73) Assignee: Nokia Technologies Oy, Espoo (FI)

( * ) Notice: Subject to any disclaimer, the term of this patent is extended or adjusted under 35 U.S.C. 154(b) by 125 days.

(21) Appl. No.: 17/802,261

(22) PCT Filed: Feb. 3, 2021

(86) PCT No.: PCT/FI2021/050072
§ 371 (c)(1),
(2) Date: Aug. 25, 2022

(87) PCT Pub. No.: WO2021/170900
PCT Pub. Date: Sep. 2, 2021

(65) Prior Publication Data

US 2023/0079683 A1 Mar. 16, 2023

(30) Foreign Application Priority Data

Feb. 26, 2020 (GB) ...................................... 2002710

(51) Int. Cl.
*H04S 7/00* (2006.01)
*H04R 5/04* (2006.01)

(52) U.S. Cl.
CPC ............... *H04S 7/303* (2013.01); *H04R 5/04* (2013.01)

(58) Field of Classification Search
CPC ...... H04R 5/04; H04R 3/005; H04R 2499/15; H04S 2400/11; H04S 2400/15;
(Continued)

(56) References Cited

U.S. PATENT DOCUMENTS

| | | | | |
|---|---|---|---|---|
| 10,869,152 | B1 * | 12/2020 | Walsh ..................... | H04S 7/306 |
| 2018/0046431 | A1 * | 2/2018 | Thagadur Shivappa . | G06F 3/16 |

(Continued)

FOREIGN PATENT DOCUMENTS

| | | |
|---|---|---|
| GB | 2554446 A | 4/2018 |
| GB | 2556093 A | 5/2018 |

(Continued)

*Primary Examiner* — Xu Mei
(74) *Attorney, Agent, or Firm* — McCarter & English, LLP

(57) ABSTRACT

An apparatus circuitry including configured to: obtain two or more audio signal sets, wherein each audio signal set is associated with a position; obtain at least one parameter value for at least two of the audio signal sets; obtain the positions associated with at least the at least two of the audio signal sets; obtain a listener position; generate at least one audio signal based on at least one audio signal from at least one of the two or more audio signal sets based on the positions associated with the at least the at least two of the audio signal sets and the listener position; generate at least one modified parameter value based on the obtained at least one parameter value for the at least two of the audio signal sets, the positions associated with the at least two of the audio signal sets and the listener position; and process the at least one audio signal based on the at least one modified parameter value to generate a spatial audio output.

20 Claims, 12 Drawing Sheets

(58) Field of Classification Search
CPC .. H04S 2420/01; H04S 7/304; H04S 2420/03; H04S 2420/11
USPC .......................................... 381/300, 309, 310
See application file for complete search history.

(56) References Cited

U.S. PATENT DOCUMENTS

| | | | | |
|---|---|---|---|---|
| 2018/0088900 | A1* | 3/2018 | Glaser ..................... | G06F 3/165 |
| 2018/0302738 | A1* | 10/2018 | Di Censo ................ | G06F 3/011 |
| 2019/0007781 | A1* | 1/2019 | Peters ..................... | H04S 3/008 |
| 2019/0306651 | A1 | 10/2019 | Vilermo et al. .................. | 7/303 |
| 2020/0021940 | A1 | 1/2020 | Choueiri et al. .................. | 7/304 |
| 2020/0029164 | A1* | 1/2020 | Swaminathan ......... | H04S 7/304 |

FOREIGN PATENT DOCUMENTS

| | | | |
|---|---|---|---|
| GB | 2572368 | A | 10/2019 |
| WO | WO 2019/086757 | A1 | 5/2019 |

* cited by examiner

AUDIO RENDERING WITH SPATIAL METADATA INTERPOLATION

CROSS REFERENCE TO RELATED APPLICATION

This patent application is a U.S. National Stage application of International Patent Application Number PCT/FI2021/050072 filed Feb. 3, 2021, which is hereby incorporated by reference in its entirety, and claims priority to GB 20027108 filed Feb. 26, 2020.

FIELD

The present application relates to apparatus and methods for audio rendering with spatial metadata interpolation, but not exclusively for audio rendering with spatial metadata interpolation for 6 degree of freedom systems.

BACKGROUND

Spatial audio capture approaches attempt to capture an audio environment such that the audio environment can be perceptually recreated to a listener in an effective manner and furthermore may permit a listener to move and/or rotate within the recreated audio environment. For example in some systems (3 degrees of freedom—3DoF) the listener may rotate their head and the rendered audio signals reflect this rotation motion. In some systems (3 degrees of freedom plus—3DoF+) the listener may 'move' slightly within the environment as well as rotate their head and in others (6 degrees of freedom—6DoF) the listener may freely move within the environment and rotate their head.

Linear spatial audio capture refers to audio capture methods where the processing does not adapt to the features of the captured audio. Instead, the output is a predetermined linear combination of the captured audio signals.

For recording spatial sound linearly at one position at the recording space, a high-end microphone array is needed. One such microphone is the spherical 32-microphone Eigenmike. From the high-end microphone array a higher-order Ambisonics (HOA) signals can be obtained and used for linear rendering. With the HOA signals, the spatial audio can be linearly rendered so that sounds arriving from different directions are satisfactorily separated in a reasonable auditory bandwidth.

An issue for linear spatial audio capture techniques are the requirements for the microphone arrays. Short wavelengths (higher frequency audio signals) need small microphone spacing, and long wavelengths (lower frequency) need a large array size, and it is difficult to meet both conditions within a single microphone array.

Most practical capture devices (for example virtual reality cameras, single lens reflex cameras, mobile phones) are not equipped with the microphone array such as provided by the Eigenmike and do not have a sufficient microphone arrangement for linear spatial audio capture. Furthermore implementing linear spatial audio capture for capture devices results in a spatial audio obtained only for a single position.

Parametric spatial audio capture refers to systems that estimate perceptually relevant parameters based on the audio signals captured by microphones and, based on these parameters and the audio signals, a spatial sound may be synthesized. The analysis and the synthesis typically takes place in frequency bands which may approximate human spatial hearing resolution.

It is known that for the majority of compact microphone arrangements (e.g., VR-cameras, multi-microphone arrays, mobile phones with microphones, SLR cameras with microphones) parametric spatial audio capture may produce a perceptually accurate spatial audio rendering, whereas the linear approach does not typically produce a feasible result in terms of the spatial aspects of the sound. For high-end microphone arrays, such as the Eigenmike, the parametric approach may furthermore provide on average a better quality spatial sound perception than a linear approach.

SUMMARY

There is provided according to a first aspect an apparatus comprising means configured to: obtain two or more audio signal sets, wherein each audio signal set is associated with a position; obtain at least one parameter value for at least two of the audio signal sets; obtain the positions associated with at least the at least two of the audio signal sets; obtain a listener position; generate at least one audio signal based on at least one audio signal from at least one of the two or more audio signal sets based on the positions associated with the at least the at least two of the audio signal sets and the listener position; generate at least one modified parameter value based on the obtained at least one parameter value for the at least two of the audio signal sets, the positions associated with the at least two of the audio signal sets and the listener position; and process the at least one audio signal based on the at least one modified parameter value to generate a spatial audio output.

The means configured to obtain two or more audio signal sets may be configured to obtain the two or more audio signal sets from microphone arrangements, wherein each microphone arrangement is at a respective position and comprises one or more microphones.

Each audio signal set may be associated with an orientation and the means may be further configured to obtain the orientations of the two or more audio signal sets, wherein the generated at least one audio signal may be further based on the orientations associated with the two or more audio signal sets, and wherein the at least one modified parameter value may be further based on the orientations associated with the two or more audio signal sets.

The means may be further configured to obtain a listener orientation, wherein the at least one modified parameter value may be further based on the listener orientation.

The means configured to process the at least one audio signal based on the at least one modified parameter value to generate a spatial audio output may be further configured to process the at least one audio signal further based on the listener orientation.

The means may be further configured to obtain control parameters based on the positions associated with the at least two of the audio signal sets and the listener position, wherein the means configured to generate at least one audio signal based on at least one audio signal from at least one of the two or more audio signal sets based on the positions associated with the at least two of the audio signal sets and the listener position may be controlled based on the control parameters.

The means configured to generate the at least one modified parameter value may be controlled based on the control parameters.

The means configured to obtain control parameters may be configured to: identify at least three of the audio signal sets within which the listener position is located and generate weights associated with the at least three of the audio signal sets based on the audio signal set positions and the listener position; and otherwise identify two of the audio signal sets closest to the listener position and generate weights associated with the two of the audio signal sets based on the audio signal set positions and a perpendicular projection of the listener position from a line between the two of the audio signal sets.

The means configured to generate at least one audio signal may be configured to perform one of: combine two or more audio signals from two or more audio signal sets based on the weights; select one or more audio signal from one of the two or more audio signal sets based on which of the two or more audio signal sets is closest to the listener position; and select one or more audio signal from one of the two or more audio signal sets based on which of the two or more audio signal sets is closest to the listener position and a further switching threshold.

The means configured to generate the at least one modified parameter value may be configured to combine the obtained at least one parameter value for at least two of the two or more audio signal sets based on the weights.

The means configured to process the at least one audio signal based on the at least one modified parameter value to generate a spatial audio output may be configured to generate at least one of: a binaural audio output comprising two audio signals for headphones and/or earphones; and a multichannel audio output comprising at least two audio signals for a multichannel speaker set.

The at least one parameter value may comprise at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

The at least two of the audio signal sets may comprise at least two audio signals, and the means configured to obtain the at least one parameter value may be configured to spatially analyse the two or more audio signals from the two or more audio signal sets to determine the at least one parameter value.

The means configured to obtain the at least one parameter value may be configured to receive or retrieve the at least one parameter value for at least two of the audio signal sets.

According to a second aspect there is provided a method for an apparatus comprising: obtaining two or more audio signal sets, wherein each audio signal set is associated with a position; obtaining at least one parameter value for at least two of the audio signal sets; obtaining the positions associated with at least the at least two of the audio signal sets; obtaining a listener position; generating at least one audio signal based on at least one audio signal from at least one of the two or more audio signal sets based on the positions associated with the at least the at least two of the audio signal sets and the listener position; generating at least one modified parameter value based on the obtained at least one parameter value for the at least two of the audio signal sets, the positions associated with the at least two of the audio signal sets and the listener position; and processing the at least one audio signal based on the at least one modified parameter value to generate a spatial audio output.

Obtaining two or more audio signal sets may comprise obtaining the two or more audio signal sets from microphone arrangements, wherein each microphone arrangement may be at a respective position and may comprise one or more microphones.

Each audio signal set may be associated with an orientation and the method may further comprise obtaining the orientations of the two or more audio signal sets, wherein the generated at least one audio signal may be further based on the orientations associated with the two or more audio signal sets, and wherein the at least one modified parameter value may be further based on the orientations associated with the two or more audio signal sets.

The method may further comprise obtaining a listener orientation, wherein the at least one modified parameter value may be further based on the listener orientation.

Processing the at least one audio signal based on the at least one modified parameter value to generate a spatial audio output may further comprise processing the at least one audio signal further based on the listener orientation.

The method may further comprise obtaining control parameters based on the positions associated with the at least two of the audio signal sets and the listener position, wherein generating at least one audio signal based on at least one audio signal from at least one of the two or more audio signal sets based on the positions associated with the at least two of the audio signal sets and the listener position may be controlled based on the control parameters.

Generating the at least one modified parameter value may be controlled based on the control parameters.

Obtaining control parameters may comprise: identifying at least three of the audio signal sets within which the listener position is located and generating weights associated with the at least three of the audio signal sets based on the audio signal set positions and the listener position; and otherwise identifying two of the audio signal sets closest to the listener position and generating weights associated with the two of the audio signal sets based on the audio signal set positions and a perpendicular projection of the listener position from a line between the two of the audio signal sets.

Generating at least one audio signal may comprise one of: combining two or more audio signals from two or more audio signal sets based on the weights; selecting one or more audio signal from one of the two or more audio signal sets based on which of the two or more audio signal sets is closest to the listener position; and selecting one or more audio signal from one of the two or more audio signal sets based on which of the two or more audio signal sets is closest to the listener position and a further switching threshold.

The method comprising generating the at least one modified parameter value may comprise combining the obtained at least one parameter value for at least two of the two or more audio signal sets based on the weights.

Processing the at least one audio signal based on the at least one modified parameter value to generate a spatial audio output may comprise generating at least one of: a binaural audio output comprising two audio signals for headphones and/or earphones; and a multichannel audio output comprising at least two audio signals for a multichannel speaker set.

The at least one parameter value may comprise at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

The at least two of the audio signal sets may comprise at least two audio signals, and obtaining the at least one parameter value may comprise spatially analysing the two or more audio signals from the two or more audio signal sets to determine the at least one parameter value.

Obtaining the at least one parameter value may comprise receiving or retrieving the at least one parameter value for at least two of the audio signal sets.

According to a third aspect there is provided an apparatus comprising at least one processor and at least one memory including a computer program code, the at least one memory and the computer program code configured to, with the at least one processor, cause the apparatus at least to: obtain two or more audio signal sets, wherein each audio signal set is associated with a position; obtain at least one parameter value for at least two of the audio signal sets; obtain the positions associated with at least the at least two of the audio signal sets; obtain a listener position; generate at least one audio signal based on at least one audio signal from at least one of the two or more audio signal sets based on the positions associated with the at least the at least two of the audio signal sets and the listener position; generate at least one modified parameter value based on the obtained at least one parameter value for the at least two of the audio signal sets, the positions associated with the at least two of the audio signal sets and the listener position; and process the at least one audio signal based on the at least one modified parameter value to generate a spatial audio output.

The apparatus caused to obtain two or more audio signal sets may be further caused to obtain the two or more audio signal sets from microphone arrangements, wherein each microphone arrangement is at a respective position and comprises one or more microphones.

Each audio signal set may be associated with an orientation and the apparatus may be further caused to obtain the orientations of the two or more audio signal sets, wherein the generated at least one audio signal may be further based on the orientations associated with the two or more audio signal sets, and wherein the at least one modified parameter value may be further based on the orientations associated with the two or more audio signal sets.

The apparatus may be further caused to obtain a listener orientation, wherein the at least one modified parameter value may be further based on the listener orientation.

The apparatus caused to process the at least one audio signal based on the at least one modified parameter value to generate a spatial audio output may be further caused to process the at least one audio signal further based on the listener orientation.

The apparatus may be further caused to obtain control parameters based on the positions associated with the at least two of the audio signal sets and the listener position, wherein the apparatus caused to generate at least one audio signal based on at least one audio signal from at least one of the two or more audio signal sets based on the positions associated with the at least two of the audio signal sets and the listener position may be controlled based on the control parameters.

The apparatus caused to generate the at least one modified parameter value may be controlled based on the control parameters.

The apparatus caused to obtain control parameters may be further caused to: identify at least three of the audio signal sets within which the listener position is located and generate weights associated with the at least three of the audio signal sets based on the audio signal set positions and the listener position; and otherwise identify two of the audio signal sets closest to the listener position and generate weights associated with the two of the audio signal sets based on the audio signal set positions and a perpendicular projection of the listener position from a line between the two of the audio signal sets.

The apparatus caused to generate at least one audio signal may be caused to perform one of: combine two or more audio signals from two or more audio signal sets based on the weights; select one or more audio signal from one of the two or more audio signal sets based on which of the two or more audio signal sets is closest to the listener position; and select one or more audio signal from one of the two or more audio signal sets based on which of the two or more audio signal sets is closest to the listener position and a further switching threshold.

The apparatus caused to generate the at least one modified parameter value may be caused to combine the obtained at least one parameter value for at least two of the two or more audio signal sets based on the weights.

The apparatus caused to process the at least one audio signal based on the at least one modified parameter value to generate a spatial audio output may be caused to generate at least one of: a binaural audio output comprising two audio signals for headphones and/or earphones; and a multichannel audio output comprising at least two audio signals for a multichannel speaker set.

The at least one parameter value may comprise at least one of: at least one direction value; at least one direct-to-total ratio associated with at least one direction value; at least one spread coherence associated with at least one direction value; at least one distance associated with at least one direction value; at least one surround coherence; at least one diffuse-to-total ratio; and at least one remainder-to-total ratio.

The at least two of the audio signal sets may comprise at least two audio signals, and the apparatus caused to obtain the at least one parameter value may be caused to spatially analyse the two or more audio signals from the two or more audio signal sets to determine the at least one parameter value.

The apparatus caused to obtain the at least one parameter value may be caused to receive or retrieve the at least one parameter value for at least two of the audio signal sets.

According to a fourth aspect there is provided an apparatus comprising: means for obtaining two or more audio signal sets, wherein each audio signal set is associated with a position; means for obtaining at least one parameter value for at least two of the audio signal sets; means for obtaining the positions associated with at least the at least two of the audio signal sets; means for obtaining a listener position; means for generating at least one audio signal based on at least one audio signal from at least one of the two or more audio signal sets based on the positions associated with the at least the at least two of the audio signal sets and the listener position; means for generating at least one modified parameter value based on the obtained at least one parameter value for the at least two of the audio signal sets, the positions associated with the at least two of the audio signal sets and the listener position; and means for processing the at least one audio signal based on the at least one modified parameter value to generate a spatial audio output.

According to a fifth aspect there is provided a computer program comprising instructions [or a computer readable medium comprising program instructions] for causing an apparatus to perform at least the following: obtaining two or more audio signal sets, wherein each audio signal set is associated with a position; obtaining at least one parameter value for at least two of the audio signal sets; obtaining the positions associated with at least the at least two of the audio signal sets; obtaining a listener position; generating at least one audio signal based on at least one audio signal from at least one of the two or more audio signal sets based on the positions associated with the at least the at least two of the audio signal sets and the listener position; generating at least one modified parameter value based on the obtained at least one parameter value for the at least two of the audio signal sets, the positions associated with the at least two of the audio signal sets and the listener position; and processing the at least one audio signal based on the at least one modified parameter value to generate a spatial audio output.

According to a sixth aspect there is provided a non-transitory computer readable medium comprising program instructions for causing an apparatus to perform at least the following: obtaining two or more audio signal sets, wherein each audio signal set is associated with a position; obtaining at least one parameter value for at least two of the audio signal sets; obtaining the positions associated with at least the at least two of the audio signal sets; obtaining a listener position; generating at least one audio signal based on at least one audio signal from at least one of the two or more audio signal sets based on the positions associated with the at least the at least two of the audio signal sets and the listener position; generating at least one modified parameter value based on the obtained at least one parameter value for the at least two of the audio signal sets, the positions associated with the at least two of the audio signal sets and the listener position; and processing the at least one audio signal based on the at least one modified parameter value to generate a spatial audio output.

According to a seventh aspect there is provided an apparatus comprising: obtaining circuitry configured to obtain two or more audio signal sets, wherein each audio signal set is associated with a position; obtaining circuitry configured to obtain at least one parameter value for at least two of the audio signal sets; obtaining circuitry configured to obtain the positions associated with at least the at least two of the audio signal sets; obtaining circuitry configured to obtain a listener position; generating circuitry configured to generate at least one audio signal based on at least one audio signal from at least one of the two or more audio signal sets based on the positions associated with the at least the at least two of the audio signal sets and the listener position; generating circuitry configured to generate at least one modified parameter value based on the obtained at least one parameter value for the at least two of the audio signal sets, the positions associated with the at least two of the audio signal sets and the listener position; and processing circuitry configured to process the at least one audio signal based on the at least one modified parameter value to generate a spatial audio output.

According to an eighth aspect there is provided a computer readable medium comprising program instructions for causing an apparatus to perform at least the following: obtaining two or more audio signal sets, wherein each audio signal set is associated with a position; obtaining at least one parameter value for at least two of the audio signal sets; obtaining the positions associated with at least the at least two of the audio signal sets; obtaining a listener position; generating at least one audio signal based on at least one audio signal from at least one of the two or more audio signal sets based on the positions associated with the at least the at least two of the audio signal sets and the listener position; generating at least one modified parameter value based on the obtained at least one parameter value for the at least two of the audio signal sets, the positions associated with the at least two of the audio signal sets and the listener position; and processing the at least one audio signal based on the at least one modified parameter value to generate a spatial audio output.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The concept as discussed herein in further detail with respect to the following embodiments is related to parametric spatial audio capturing with two or more microphone arrays corresponding to different positions at the recording space and to enabling the user to move to different positions at the captured sound scene, in other words, the present invention relates to 6DoF audio capture and rendering.

6DoF is presently a commonplace in virtual reality, such as VR games, where movement at the audio scene is straightforward to render as all spatial information is readily available (i.e., the position of each sound source as well as the audio signal of each source separately). The present invention relates to providing robust 6DoF capturing and rendering also to spatial audio captured with microphone arrays.

6DoF capturing and rendering from microphone arrays is relevant, e.g., for the upcoming MPEG-I audio standard, where there is a requirement of 6DoF rendering of HOA signals. These HOA signals may be obtained from microphone arrays at a sound scene.

In the following examples the audio signal sets are generated by microphones. For example a microphone arrangement may comprise one or more microphones and generate for the audio signal set one or more audio signals. In some embodiments the audio signal set comprises audio signals which are virtual or generated audio signals (for example a virtual speaker audio signal with an associated virtual speaker location).

Figure 1:
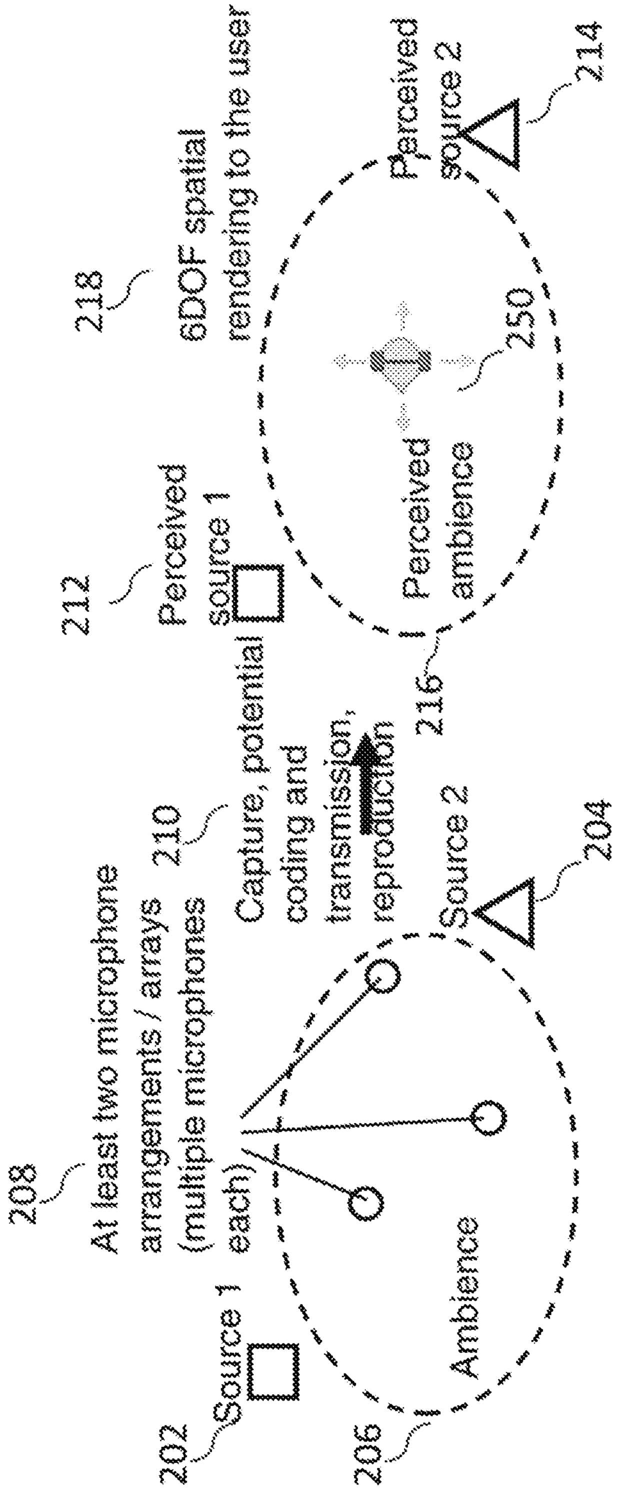
FIG. 1 shows schematically a system of apparatus suitable for implementing some embodiments.

Before discussing the concept in further detail we will initially describe in further detail some aspects of spatial capture and reproduction. For example with respect to FIG. 1 is shown an example of spatial capture and playback. Thus for example FIG. 1 shows on the left hand side a spatial audio signal capture environment. The environment or audio scene comprises sources, source 1 202 and source 2 204 which may be actual sources of audio signals or may be abstract representations of audio sources. Furthermore is shown non-directional or non-specific location ambience part 206. These can be captured by at least two microphone arrangements/arrays which can comprise two or more microphones each.

The audio signals can as described above be captured and furthermore may be encoded, transmitted, received and reproduced as shown in FIG. 1 by arrow 210.

An example reproduction is shown on the right hand side of FIG. 1. The reproduction of the spatial audio signals results in the user 250, which in this example is shown wearing head-tracking headphones being presented with a reproduced audio environment in the form of a 6DoF spatial rendering 218 which comprises a perceived source 1 212, a perceived source 2 214 and perceived ambience 216.

As discussed above, conventional linear and parametric spatial audio capture methods for microphone arrays can be used for high-quality spatial audio processing, depending on the available microphone arrangement. However, they both are developed for single position capturing and rendering. In other words the listener cannot move in between microphone arrays. Thus, they are not directly applicable for 6DOF rendering, where the listener may freely move in between the microphone arrays.

The embodiments as discussed herein aim to provide broadband 6DOF rendering methods. These aim to improve on known parametric rendering from microphone arrays. For example they aim to improve on methods where the distance parameters are estimated in frequency bands (in addition to the direction parameters), in other words, where sound positions are estimated for 6DOF rendering. The improvement relates to the property that sound source distances or positions are not estimated reliably in all acoustic situations, and where mistakes in distance/position estimates generate significant errors in 6DOF playback. This effect is pronounced when the movement of the listener in relation to the capture position is significant (e.g., more than 1 meter in any direction).

Figure 2:
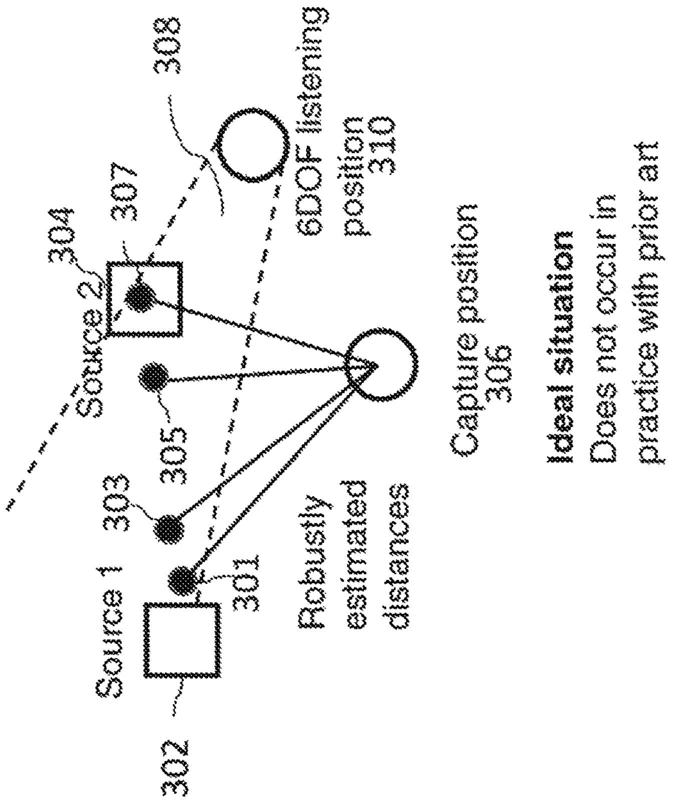
FIGS. 2 and 3 shows schematically a system of apparatus showing the effect of distance errors on rendering.
Figure 3:
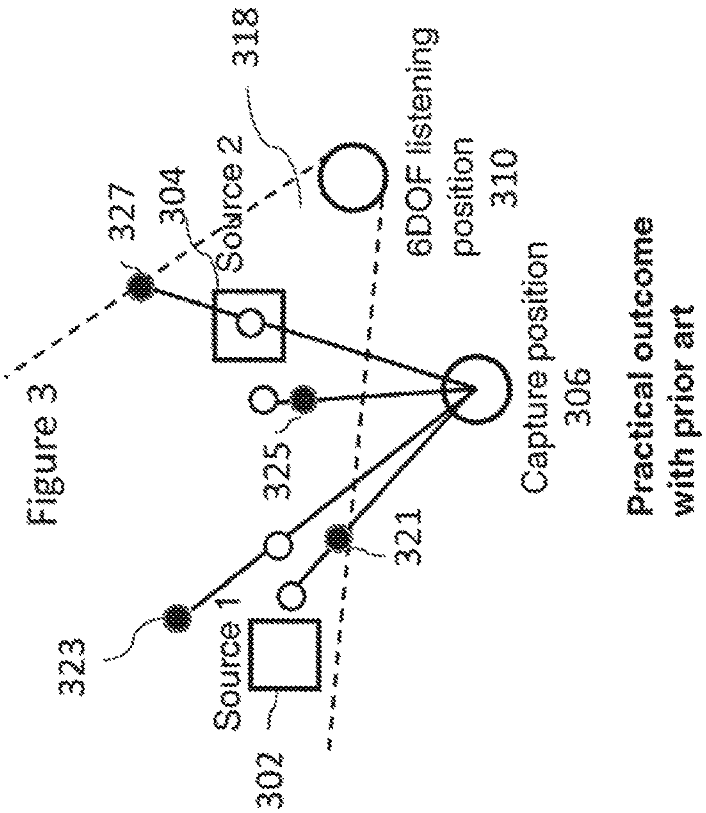

With respect to FIGS. 2 and 3 there is shown a situation with multiple sources. FIG. 2 for example shows an ideal capture situation. There is shown a capture position 306 and the black dots 301, 303, 305, 307 show estimated directions and distances for individual time-frequency tiles. As illustrated in the figure, when there are multiple sound sources active at the same time, the direction parameter at the parametric capture does not necessarily point to either of the sources, but may point somewhere between the sources. This is a not a problem for a parametric capture system since such perceptual/dominant direction is known to well approximate the sound situation in a perceptual sense. However, as a particularly relevant and ideal aspect of FIG. 2, also the distances are well estimated. Thus, regardless of the listening position 310 a (perceptual/dominant) direction is reproduced at the arc 308 (shown by the dashed lines) between the source directions (source 1 302 and source 2 304).

However FIG. 3 shows a further example of the same arrangement, in multiple-source situations where the distance estimates are noisy, which is a more realistic example in such a multi-source situation. This distance estimate noise causes false estimated positions 321, 323, 325, 327. If the sound is rendered at listening position 306 this distance estimate does not cause significant directional errors. However, when sound is rendered at a significantly different listening position 310 then the sound directions are rendered with large spatial errors. The (perceptual/dominant) direction is reproduced at the arc 318 (shown by the dashed lines) that spans significantly outside the source directions (source 1 302 and source 2 304). Thus the spatial reproduction is in this example 'spreads' more when compared to the 'ideal' arc 308 (shown by the dashed lines) shown in FIG. 2.

As a result of incorrect estimated distances where the listener in "full" 6DOF rendering can move freely (and is not just close to the microphone array position) the rendered audio when the user is at the capture position 306, the sound directions are appropriately rendered, as the false distances do not affect the rendered directions. At each time-frequency tile, the perceptual/dominant direction is rendered at the arc determined by the two simultaneous sources. However when the user moves to the illustrated 6DOF listening position 310, the effect of false distance estimates becomes apparent. At that position, the sound directions that are rendered are not in between the two sources. In other words, the result is a wide and ambiguous spatial rendering output (in contrast to accurate and point-like perception of the sources) with potential occasional spatial artefacts even far away from the actual source directions.

Hence the embodiments attempt to provide suitable 6DOF audio capture and rendering from microphone arrays where there are multiple sound sources and/or the listener can move freely.

Although the perceptually relevant parameters can be any suitable parameters the following examples discussed herein obtain the following parameter set:

at least one direction parameter in frequency bands indicating the prominent (or dominant or perceptual) direction (s) where the sound arrives from, and a ratio parameter indicating how much energy arrives from those direction(s) and how much of the sound energy is ambience/surrounding.

As discussed above there are different methods to obtain these parameters. A known method is Directional Audio Coding (DirAC), in which, based on a 1st order Ambisonic signal (or a B-format signal), a direction and a diffuseness (i.e., ambient-to-total energy ratio) parameter is estimated in frequency bands. In the following examples DirAC is used as a main example of parameter generation, although it is known that it is replaceable with other methods to obtain spatial parameters or spatial metadata such as, Higher-order DirAC, High-angular planewave expansion, and Nokia's spatial audio capture (SPAC) as discussed in PCT application WO2018/091776.

The embodiments as described aim to produce a good quality position tracked spatial sound reproduction for situations with clear identifiable sources, and also more demanding audio scenes. For example, in outdoor environments there often are many simultaneous sources active. When there are multiple sources (more sources than direction parameters), the direction parameter is no longer a physical descriptor pointing towards a source but a perceptual descriptor. This means that, for example, if there are two sources, the direction parameter typically fluctuates in the region between the two sources depending on the source energies in the time-frequency intervals. From this follows the situation why distance estimates may fail as illustrated in FIG. 3. For example, the fluctuation of direction parameter or the ratio parameter may be used to estimate the distance, since room reverberation and source distance affect these properties. However, when doing so, the distance parameter becomes artificially large, since a certain fluctuation or ratio is not because of source distance (reverberation) but also because of the simultaneous sources. Also if visual depth maps are used for distance estimation, the fluctuating direction does not often correspond to the actual source directions, and the distances are then wrongly estimated. The distance can also be estimated from two arrays and finding intersections of projected rays from the arrays towards the estimated directions. However, the fluctuating directions due to the complex sound scenes provide very noisy crossing-points and thus noisy distance estimates.

In other words, the embodiments aim to produce low error parameter estimation at complex audio scenes as these parameter estimation errors tend to lead to spatial errors at the 6DOF reproduced sound. Furthermore in some embodiments there is provided a 6DOF rendering that does not rely on distance estimation, and higher robustness is thus provided also for complex situations. The embodiments may interpolate the spatial metadata to positions between the actual capture position.

As such the embodiments as discussed herein may relate to 6-degree-of-freedom (i.e., the listener can move within the scene and the listener position is tracked) binaural rendering of audio captured with at least two microphone arrays in known positions. These embodiments may furthermore provide a high-quality binaural audio rendering at a wide range of (6DOF-tracked) listening positions and sound field conditions, improving in particular the situation in which multiple simultaneous sources are active and when the listener is not near the array positions. The embodiments may furthermore determine spatial metadata for the array positions using the corresponding microphone array signals, predicting the spatial metadata for the listener position using the determined spatial metadata (based on the listener and array positions), determining a selection or mixture of the array signals (based on the listener and array positions), and parametrically rendering a spatial audio output based on the predicted the spatial metadata and the determined selection or mixture of the array signals.

In some embodiments the apparatus and methods may further be configured so that the determined selection or mixture of the array signals refers to the signals from the nearest array, and when the user moves to a position that is nearer to (by a threshold) to position of another array than the previously nearest array, then the selection or mixture of the array signals is changed such that the binaural audio signal is rendered based on the audio signals from the another array and the predicted spatial metadata.

In some embodiments the array signals may refer to the microphone array signals, or signals based on them, such as the array signals converted to an Ambisonic format.

Figure 4:
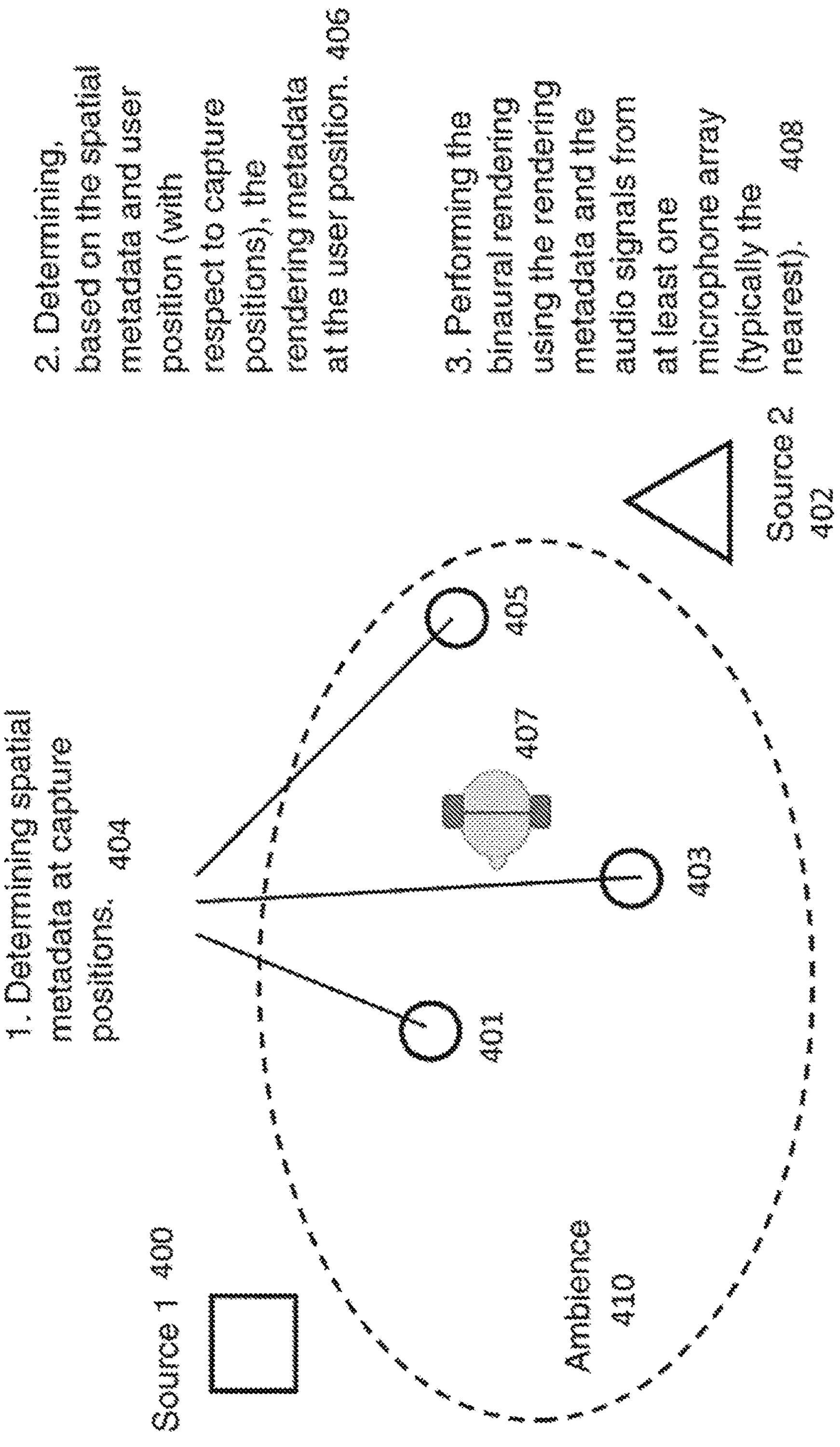
FIG. 4 shows an overview of some embodiments with respect to the capture and rendering of spatial metadata.

An example system within which the embodiments can be implemented is shown in FIG. 4. FIG. 4 for example shows a system within which there are audio components, source 1 400, source 2 402 and ambience 410. Additionally within the system there are capture apparatus 401, 403 and 405 located at capture positions within the environment and are configured to capture audio signals and from these audio signals obtain or determine spatial metadata 404.

The system further comprises a listener (user) apparatus 407 configured to generate suitable binaural audio signals. Thus in some embodiments the apparatus 407 is configured to determine, based on the spatial metadata and user position (with respect to capture positions), the rendering metadata at the user position 406. Furthermore the apparatus 407 is configured to perform the binaural rendering using the rendering metadata and the audio signals from at least one microphone array (which may be the nearest) 408.

The embodiments may thus produce good audio quality even in the case of multiple simultaneous sound sources and even for listening positions that are not near the capture apparatus microphone array positions. These embodiments omit the use of distance metadata (which was indicated as being unreliable in cases of multiple simultaneous sources and to cause directional errors when rendering spatial audio in the positions away from the microphone array positions). Instead the embodiments show direct prediction of directions in frequency bands for the listening position based on the directions (and the direct-to-total energy ratios) determined at the microphone positions. As estimating the directions (and the direct-to-total energy ratios) is more reliable, the directional errors produced by some embodiments are significantly reduced and better audio quality is produced.

Figure 5:
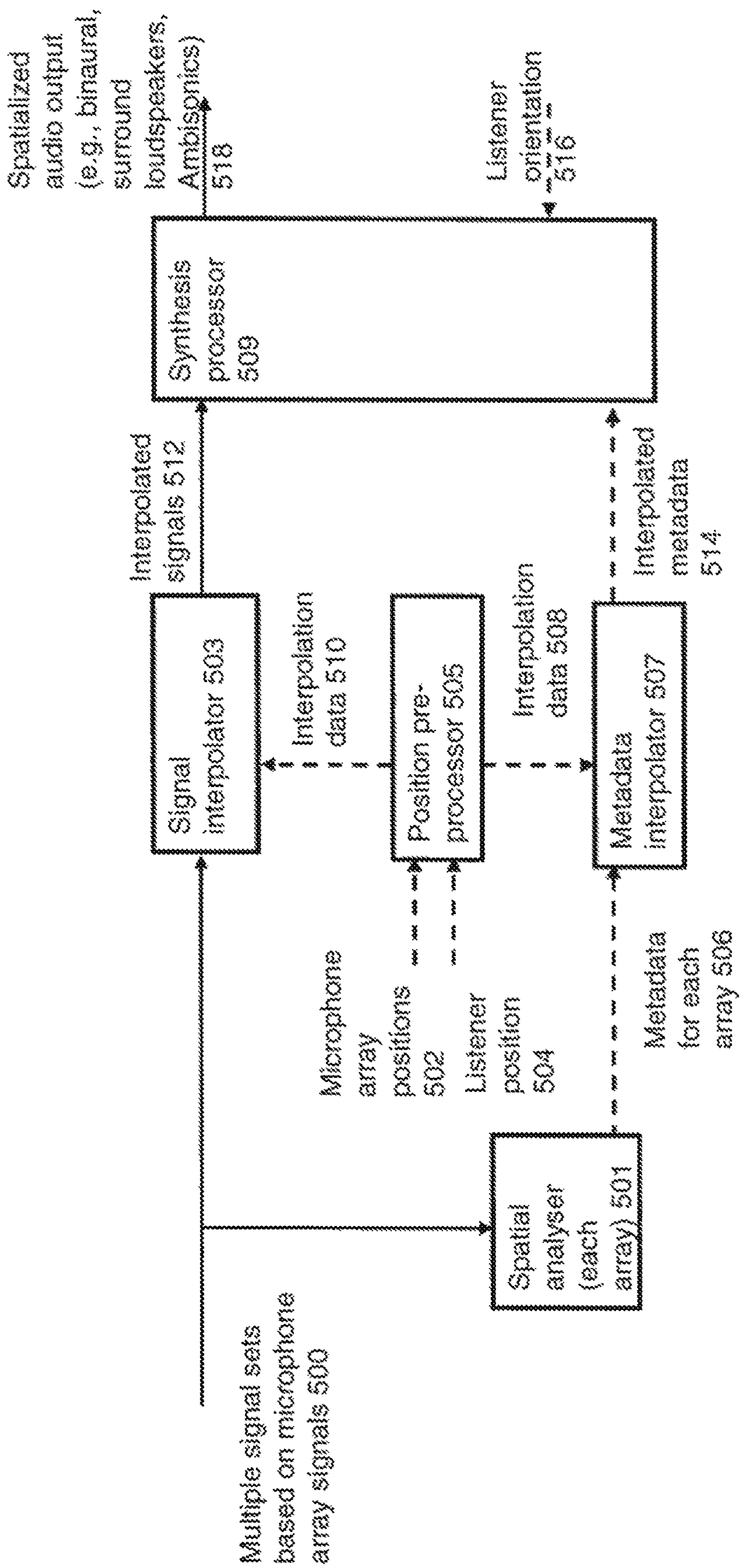
FIG. 5 shows schematically suitable apparatus for implementing interpolation of audio signals and metadata according to some embodiments.

With respect to FIG. 5 an example system is shown. In some embodiments this system may be implemented on a single apparatus. However, in some other embodiments the functionality described herein may be implemented on more than one apparatus.

In some embodiments the system comprises an input configured to receive multiple signal sets based on microphone array signals 500. The multiple signal sets based on microphone array signals may comprise J sets of multichannel signals. The signals may be microphone array signals themselves, or the array signals in some converted form, such as Ambisonic signals. These signals are denoted as $s_j(m,i)$, where j is the index of the microphone array from which the signals originated (i.e., the signal set index), m is the time in samples, and i is the channel index of the signal set.

The multiple signal sets can be passed to a signal interpolator 503 and to a spatial analyser 501.

In some embodiments the system comprises a spatial analyser 501. The spatial analyser 501 is configured to receive the audio signals $s_j(m,i)$ and analyse these to determine spatial metadata for each array in time-frequency domain.

The spatial analysis can be based on any suitable technique and there are already known suitable methods for a variety of input types. For example, if the input signals are in an Ambisonic or Ambisonic-related form (e.g., they originate from B-format microphones), or the arrays are such that can be in a reasonable way converted to an Ambisonic form (e.g., Eigenmike), then Directional Audio Coding (DirAC) analysis can be performed. First order DirAC has been described in Pulkki, Ville. "Spatial sound reproduction with directional audio coding." Journal of the Audio Engineering Society 55, no. 6 (2007): 503-516, in which a method is specified to estimate from a B-format signal (a variant of a first-order Ambisonics) a set of spatial metadata consisting of direction and ambient-to-total energy ratio parameters in frequency bands.

When higher orders of Ambisonics are available, then Archontis Politis, Juha Vilkamo, and Ville Pulkki. "Sector-based parametric sound field reproduction in the spherical harmonic domain." IEEE Journal of Selected Topics in Signal Processing 9, no. 5 (2015): 852-866 provides methods for obtaining multiple simultaneous direction parameters. Further methods which may be implemented in some embodiments include estimating the spatial metadata from flat devices such as mobile phones and tablets as described in PCT published patent application WO2018/091776, and a similar delay-based analysis method for non-flat devices GB published patent application GB2572368.

In other words, there are various methods to obtain spatial metadata and a selected method may depend on the array type and/or audio signal format. In some embodiments, one method is applied at one frequency range, and another method at another frequency range. In the following examples the analysis is based on receiving first-order Ambisonic (FOA) audio signals (which is a widely known signal format in the field of spatial audio). Furthermore in these examples a modified DirAC methodology is used. For example the input is an Ambisonic audio signal in the known SN3D normalized (Schmidt semi-normalisation) and ACN (Ambisonics Channel Number) channel-ordered form.

In some embodiments the spatial analyser is configured to perform the following for each microphone array:

1) First, the input signals $s_j(m,i)$ are converted to a time-frequency domain format signal. For example the conversion may be implemented using a short-time Fourier transform (STFT) or a complex-modulated quadrature mirror filter (QMF) bank. As an example, the STFT is a procedure that is typically configured so that for a frame length of N samples, the current and the previous frame are windowed (e.g., with a sinusoid window) and processed with a fast Fourier transform (FFT). The result is the time-frequency domain signals which are denoted as $S_j(b,n,i)$, where b is the frequency bin and n is the temporal frame index. The time-frequency signals (which are in this case 4-channel FOA signals) are grouped in a vector form by $$s_j(b,n)=\begin{bmatrix} S_j(b,n,1)\\ S_j(b,n,2)\\ S_j(b,n,3)\\ S_j(b,n,4)\end{bmatrix}$$

2) Next, the time-frequency signals are used in frequency bands. While a frequency bin denotes a single complex sample in the STFT domain, a frequency band denotes a group of these bins. Denoting k=1 . . . K as the frequency band index and K is the number of frequency bands, each band k has a lowest bin $b_{k,low}$ and a highest bin $b_{k,high}$. In some embodiments a signal covariance matrix is estimated in frequency bands by $$C_{FOA,j}(k,n)=\begin{bmatrix} c_{1,1,j}(k,n) & c_{1,2,j}(k,n) & c_{1,3,j}(k,n) & c_{1,4,j}(k,n)\\ c_{1,2,j}(k,n) & c_{2,2,j}(k,n) & c_{2,3,j}(k,n) & c_{2,4,j}(k,n)\\ c_{1,3,j}(k,n) & c_{3,2,j}(k,n) & c_{3,3,j}(k,n) & c_{3,4,j}(k,n)\\ c_{1,4,j}(k,n) & c_{4,2,j}(k,n) & c_{4,3,j}(k,n) & c_{4,4,j}(k,n)\end{bmatrix}=\sum_{b=b_{k,low}}^{b_{k,high}} s_j(b,n)s_j^H(b,n)$$

In some embodiments there may be applied temporal smoothing over time indices n.

3) Then, an inverse sound field intensity vector is determined that points to the opposing direction of the propagating sound $$i_j(k,n)=Re\left\{\begin{bmatrix} c_{1,4,j}(k,n)\\ c_{1,2,j}(k,n)\\ c_{1,3,j}(k,n)\end{bmatrix}\right\}$$

Note the channel order, which converts the ACN order to the cartesian x, y, z order.

4) Then, the direction parameter for band k and time index n is determined as the direction of $i_j(k,n)$. The direction parameter may be expressed for example as azimuth $\theta_j(k,n)$ and elevation $\varphi_j(k,n)$.

5) The direct-to-total energy ratio is then formulated as $$r_j(k,n)=\frac{2|i_j(k,n)|}{\sum_{p=1}^{4} c_{p,p,j}(k,n)}$$

The azimuth $\theta_j(k,n)$, elevation $\varphi_j(k,n)$ and direct-to-total energy ratio $r_j(k,n)$ are formulated for each band k, for each time index n, and for each signal set (each array) j. This information thus forms the Metadata for each array 506 that is output from the spatial analyser to the metadata interpolator 507.

In some embodiments the system furthermore comprises a position pre-processor 505. The position pre-processor 505 is configured to receive information about the microphone array positions 502 and the listener position 504 within the audio environment.

As it is known in the prior art, the key aim in parametric spatial audio capture and rendering is to obtain a perceptually accurate spatial audio reproduction for the listener. Thus the position pre-processor 505 is configured to be able to determine for any position (as the listener may move to arbitrary positions), interpolation data to allow the modification of metadata based on the microphone array positions 502 and the listener position 504.

In the example here the microphone arrays are located on a plane. In other words, the arrays have no z-axis displacement component. However extending the embodiments to the z-axis can be implemented in some embodiments, as well as to situations where the microphone arrays are located on a line (in other words there is only one axis displacement).

Figure 7:
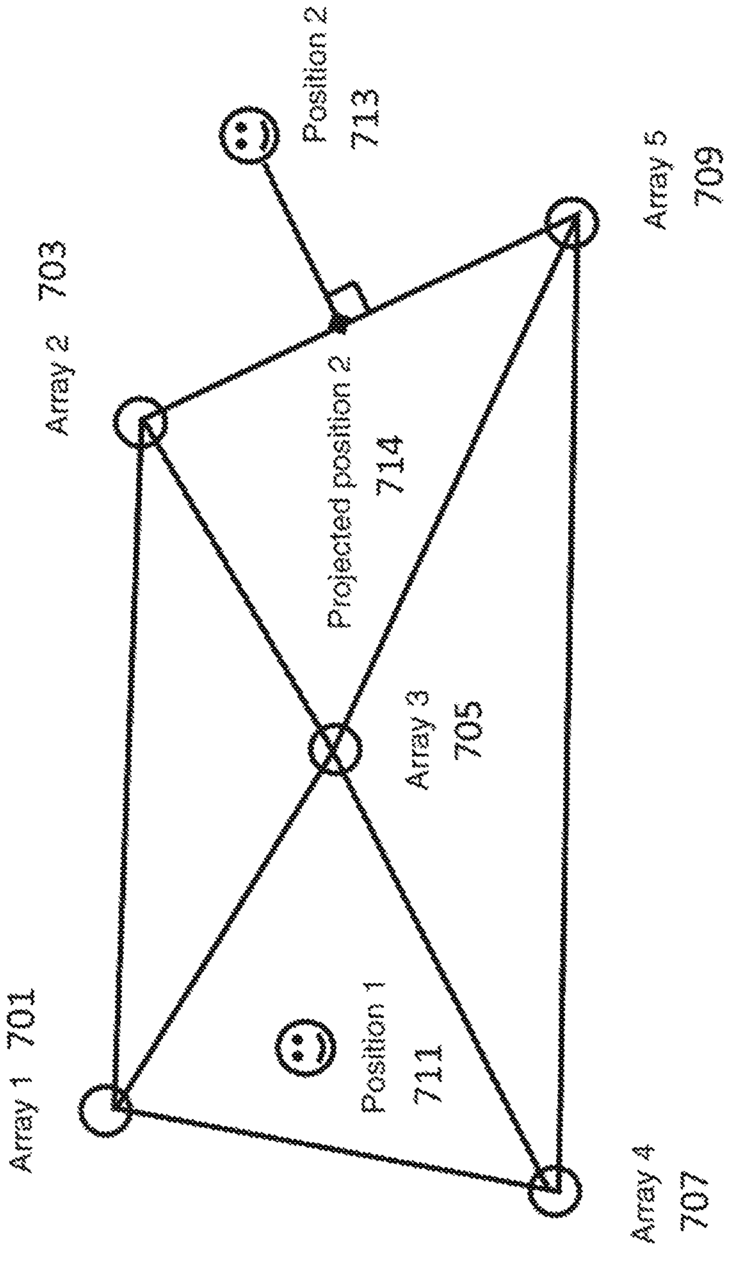
FIG. 7 shows schematically source positions within and outside of the array configuration.

For example FIG. 7 shows a microphone arrangement where the microphone arrays (shown as circles Array 1 701, Array 2 703, Array 3 705, Array 4 707 and Array 5 709) are positioned on a plane. The spatial metadata has been determined at the array positions. The arrangement has five microphone arrays on a plane. The plane may be divided into interpolation triangles, for example, by Delaunay triangulation. When a user moves to a position within a triangle (for example position 1 711, then the three microphone arrays that form a triangle containing the position are selected for interpolation (Array 1 701, Array 3 705 and Array 4 707 in this example situation). When the user moves outside of the area spanned by the microphone arrays (for example position 2 713), the user position is projected to the nearest position at the area spanned by the microphone arrays (for example projected position 2 714), and then an array-triangle is selected for interpolation where the projected position resides (in this example, these arrays are Array 2 703, Array 3 705, and Array 5 709). When the position is projected, the projected position overrides the original listener position parameter.

In the above example, the projecting of the position thus maps the positions outside the area determined by the microphone arrangements to the edge of the area determined by the microphone arrangements. Although this may appear as a limitation, in practice, when considering 6DOF media capture and reproduction, the audio is accompanied with a video obtained from a group of VR cameras that enable 6DOF video reproduction. It is expected that the area spanned by the VR cameras (due to the necessity of producing also a video) also limits the area where the user can move within the scene, and it is further expected that each VR camera also includes microphone arrangements. Thus, the most important area of interpolation is within the area spanned by the microphone arrays. The projection thus accounts for that the present method does not completely fail outside of the determined area. The nearest projected position is a fair approximation of the sound field properties at the positions slightly outside of the area spanned by the microphone arrangements.

The position pre-processor 505 can thus determine:

The listener position vector $p_L$ (a 2-by-1 vector in this example containing the x and y coordinates) which may be the original position or the projected position;

Three microphone arrangement indices $j_1$, $j_2$, $j_3$ and corresponding position vectors $p_{jx}$. These three microphone arrangements are those encapsulating position $p_L$.

The position pre-processor 505 can furthermore further formulate interpolation weights $w_1$, $w_2$, $w_3$. These weights can be formulated for example using the following known conversion between barycentric and Cartesian coordinates. First a 3×3 matrix is determined based on position vectors $p_{jx}$ by appending each vector with a unity value and combining the resulting vectors to a matrix $$P_{j_1,j_2,j_3} = \begin{bmatrix} p_{j_1} & p_{j_2} & p_{j_3} \\ 1 & 1 & 1 \end{bmatrix}$$

Then, the weights are formulated using a matrix inverse and a 3×1 vector that is obtained by appending the listener position vector $p_L$ with unity value $$\begin{bmatrix} w_1 \\ w_2 \\ w_3 \end{bmatrix} = P^{-1}_{j_1,j_2,j_3} \begin{bmatrix} p_L \\ 1 \end{bmatrix}$$

The interpolation weights ($w_1$, $w_2$, and $w_3$), position vectors ($p_L$, $p_{j_1}$, $p_{j_2}$, and $p_{j_3}$), and the microphone arrangement indices ($j_1$, $j_2$, and $j_3$) together form the interpolation data 508 and 510 which are provided to the signal interpolator 503 and the metadata interpolator 507.

In some embodiments the system comprises a metadata interpolator 507 configured to receive the interpolation data 508 and the Metadata for each array 506. The metadata interpolator is then configured to interpolate the metadata using the interpolation weights $w_1$,$w_2$, $w_3$. In some embodiments this may be implemented by firstly converting the spatial metadata to a vector form:

$$v_j(k, n) = \begin{bmatrix} \cos(\theta_j(k, n))\cos(\varphi_j(k, n)) \\ \sin(\theta_j(k, n))\cos(\varphi_j(k, n)) \\ \sin(\varphi_j(k, n)) \end{bmatrix} r_j(k, n)$$

Then, these vectors are averaged by $$v(k,n)=w_1 v_{j_1}(k,n)+w_2 v_{j_2}(k,n)+w_3 v_{j_3}(k,n)$$

Then, denoting $$v(k,n)=[v_1(k,n)v_2(k,n)v_3(k,n)]^T,$$

the interpolated metadata is obtained by $$\theta'(k,n)=\text{atan2}(v_2(k,n),v_1(k,n))$$

$$\varphi'(k,n)=\text{atan2}(v_3(k,n),\sqrt{v_1^2(k,n)+v_2^2(k,n)})$$

$$r'(k,n)=\sqrt{v_1^2(k,n)+v_2^2(k,n)+v_3^2(k,n)}$$

The interpolated metadata 514 is then output to the synthesis processor 509.

In the above, one example of metadata interpolation was presented. Other interpolation rules may be also designed and implemented in other embodiments. For example, the interpolated ratio parameter may be also determined as a weighted average (according to $w_1$, $w_2$, $w_3$) of the input ratios. Furthermore, in some embodiments, the averaging may also involve weighting according to the energy of the array signals.

In some embodiments the system further comprises a signal interpolator 503. The signal interpolator is configured to receive the input audio signals 500 and the interpolation data 510. The signal interpolator 503 in some embodiments may first convert the input signals into time-frequency domain in the same manner as the spatial analyser 501. In some embodiments the signal interpolator 503 is configured to receive the time-frequency audio signals from the spatial analyser 501 directly.

The signal interpolator 503 may then be configured to determine an overall energy for each signal and for each band. In the examples shown herein the signals are in a form of FOA signals, and thus the overall energy can be determined as $E_j(k,n)=c_{1,1,j}(k,n)$. This value can be formulated in the same manner as in (or obtained from) the spatial analyser 501.

The signal interpolator 503 may then be configured to determine for indices $j_1$, $j_2$, $j_3$ the distance values $d_{jx}=|p_L p_{j_x}|$, and the index with the smallest distance denoted as $j_{minD}$.

Then, the signal interpolator 503 is configured to determine the selected index $j_{sel}$. For the first frame (or, when the processing begins), the signal interpolator may set $j_{sel}=j_{minD}$.

For the next or succeeding frames (or any desired temporal resolution), when the user position has potentially changed, the signal interpolator is configured to resolve whether the selection $j_{sel}$ needs to be changed. The changing is needed if $j_{sel}$ is not contained by $j_1$, $j_2$, $j_3$. This condition means that the user has moved to another region which does not contain $j_{sel}$ The changing is also needed if $d_{j_{sel}} > d_{j_{minD}}\alpha$, where $\alpha$ is a threshold value. For example, $\alpha=1.2$. This condition means that the user has moved significantly closer to the array position of $j_{minD}$ when compared to array position of $j_{sel}$. The threshold is needed so that the selection does not erratically change back and forth when the user is in the middle of the two positions (in other words to provide a hysteresis threshold to prevent rapid switching between arrays).

If either of the above conditions is met, then $j_{sel}=j_{minD}$. Otherwise, the previous value of $j_{sel}$ is kept.

The intermediate interpolated signal is determined as $$S'_{interp}(b,n,i)=S_{j_{sel}}(b,n,i)$$

With such processing, when $j_{sel}$ changes, it follows that the selection is changed for all frequency bands at the same time. In some embodiments, the selection is set to change in a frequency-dependent manner. For example, when $j_{sel}$ changes, then some of the frequency bands are updated immediately, whereas some other bands are changed at the next frames until all bands are changed. Changing the signal in such a frequency-dependent manner may be needed to reduce potential switching artefacts at signal $S'_{interp}(b,n,i)$ In such a configuration, when the switching is taking place, it is possible that for a short transition period, some frequencies of signal $S'_{interp}(b,n,i)$ are from one microphone array, while the other frequencies are from another microphone array.

Then, the intermediate interpolated signal $S'_{interp}(b,n,i)$ is energy corrected. An equalization gain is formulated in frequency bands $$g(k,n)=\min\left(g_{max},\sqrt{\frac{E_{j_1}(k,n)w_1+E_{j_2}(k,n)w_2+E_{j_3}(k,n)w_3}{E_{j_{sel}}(k,n)}}\right)$$

The $g_{max}$ value limits excessive amplification, for example, $g_{max}=4$. Then the equalization is performed by multiplication $$S(b,n,i)=g(k,n)S'_{interp}(b,n,i)$$

where k is the band index where bin b resides. The signal S(b,n,i) is then the interpolated signals 512 that is output to the synthesis processor.

The system furthermore comprises a synthesis processor 509. The synthesis processor may be configured to receive listener orientation information 516 (for example head orientation tracking information) as well as the interpolated signals 512 and interpolated metadata 514.

In some embodiments the synthesis processor is configured to determine a vector rotation function to be used in the following formulation. According to the principles in Laitinen, M. V., 2008. Binaural reproduction for directional audio coding. Master's thesis, Helsinki University of Technology, pages 54-55, it is possible to define a rotate function as $$\begin{bmatrix}x'\\y'\\z'\end{bmatrix}=\text{rotate}\left(\begin{bmatrix}x\\y\\z\end{bmatrix},\text{yaw, pitch, roll}\right)$$

where yaw, pitch and roll are the head orientation parameters and x,y,z are the values of a unit vector that is being rotated. The result is x',y',z', which is the rotated unit vector. The mapping function performs the following steps:

1. Yaw rotation $$x_1=\cos(\text{yaw})x+\sin(\text{yaw})y$$

$$y_1=-\sin(\text{yaw})x+\cos(\text{yaw})y$$

$$z_1=z$$

2. Pitch rotation $$x_2=\cos(-\text{pitch}+a\tan2(z_1,x_1))\sqrt{1-y_1^2}$$
$$y_2=y_1$$
$$z_2=\cos\left(-\frac{\pi}{2}-\text{pitch}+a\tan2(z_1,x_1)\right)\sqrt{1-y_1^2}$$

3. And finally, roll rotation $$x'=x_2$$
$$y'=\cos(\text{roll}+a\tan2(z_2,y_2))\sqrt{1-x_2^2}$$
$$z'=\cos\left(-\frac{\pi}{2}+\text{roll}+a\tan2(z_2,y_2)\right)\sqrt{1-x_2^2}$$

The synthesis processor 509 may implement, having determined these parameters any suitable spatial rendering. For example in some embodiments the synthesis processor 509 may implement a 3DOF rendering, for example, according to the principles described in PCT publication WO2019086757. In such embodiments rendering of parametric audio signals (audio and spatial metadata) to a binaural, Ambisonic, or surround loudspeaker form 518 can be implemented.

Figure 6:
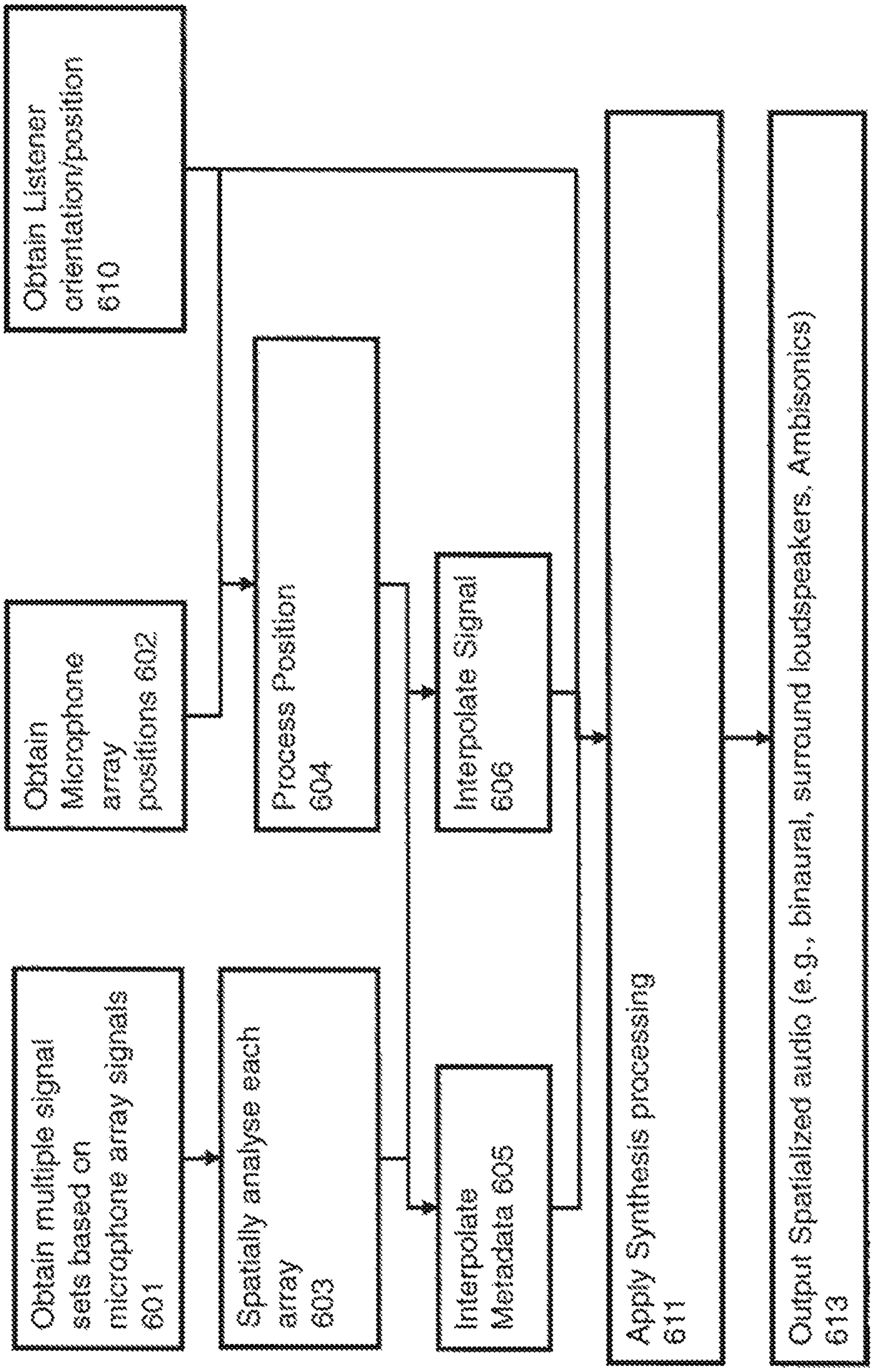
FIG. 6 shows a flow diagram of the operations of the apparatus shown in FIG. 5 according to some embodiments.

With respect to FIG. 6 is shown a flow diagram showing the operations of FIG. 5.

Thus in some embodiments there may be an obtaining of multiple signal sets based on microphone array signals as shown in FIG. 6 by step 601.

Having obtained the multiple signal sets there may be a spatial analysis of each array as shown in FIG. 6 by step 603.

Also there may be an obtaining of microphone array positions as shown in FIG. 6 by step 602.

Furthermore there may be an obtaining of Listener position/orientation as shown in FIG. 6 by step 610.

Having obtained the microphone array positions and listener orientations/positions then the method may obtain interpolation factors by processing the relative positions as shown in FIG. 6 by step 604.

Having obtained the interpolation factors by processing the relative positions and the signals/metadata then the method may interpolate the signals as shown in FIG. 6 by step 606 and interpolate the metadata as shown in FIG. 6 by step 605.

Having determined the interpolated metadata and signals and the listener orientation/position then the method may apply synthesis processing as shown in FIG. 6 by step 611.

The spatialized audio is output as shown in FIG. 6 by step 613.

Figure 8:
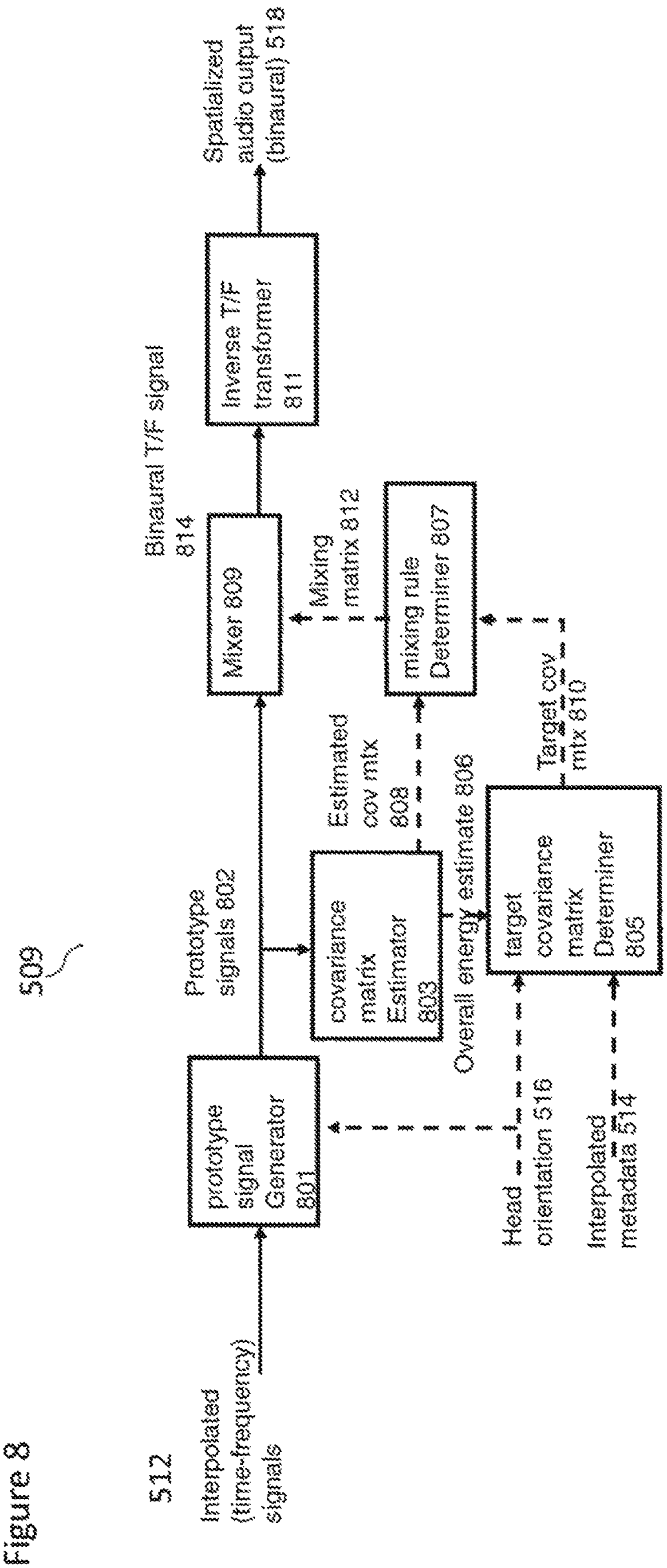
FIG. 8 shows schematically a synthesis processor as shown in FIG. 5 according to some embodiments.

The synthesis processor 509 is shown in further detail in FIG. 8.

The synthesis processor 509 in some embodiments comprises a prototype signal generator 801. The prototype signal generator 801 in some embodiments is configured to receive the interpolated signals 512, which are received in the time-frequency domain, along with the head (user/listener) orientation information 516.

A prototype signal is a signal that at least partially resembles the processed output and thus serves as a good starting point to perform the parametric rendering. In the present example, the output is a binaural signal, and as such, the prototype signal is designed such that it has two channels (left and right) and it is oriented in the spatial audio scene according to the user's head orientation. The two-channel (for i=1,2) prototype signals may be formulated, for example, by $$S_{proto}(b, n, i) = \sum_{\hat{i}=1}^{4} p_{i,\hat{i}} S(b, n, \hat{i})$$

where $p_{i,\hat{i}}$ are the mixing weights according to the head orientation information. For example, the prototype signal can be two cardioid pattern signals generated from the interpolated FOA signals, one pointing towards the left direction (with respect to user's head orientation), and one towards the right direction. Such patterns are obtained when $p_{1,1}=p_{2,1}=0.5$ and (assuming the WYZX channel order)

$$p_{1,2}=0.5[\cos(\text{yaw})\cos(\text{roll})+\sin(\text{yaw})\sin(\text{pitch})\sin(\text{roll})]$$

$$p_{1,3}=-0.5\cos(\text{pitch})\sin(\text{roll})$$

$$p_{1,4}=0.5[\cos(\text{yaw})\sin(\text{pitch})\sin(\text{roll})-\sin(\text{yaw})\cos(\text{roll})]$$

and $$\begin{bmatrix} p_{2,2} \\ p_{2,3} \\ p_{2,4} \end{bmatrix} = -\begin{bmatrix} p_{1,2} \\ p_{1,3} \\ p_{1,4} \end{bmatrix}.$$

The above example of cardioid-shaped prototype signals is only one example. In other examples, the prototype signal could be different for different frequencies, for example, at lower frequencies the spatial pattern may be less directional than a cardioid, while at the higher frequencies the shape could be cardioid. Such a choice is motivated since it is more similar to a binaural signal than a wide-band cardioid pattern is. However, it is not very critical which pattern design is applied, as long as the general tendency is to obtain some left-right differentiation for the prototype signals. This is since the parametric processing steps described in the following will correct the inter-channel features regardless.

The prototype signals may then be expressed in a vector form $$x(b, n) = \begin{bmatrix} S_{proto}(b, n, 1) \\ S_{proto}(b, n, 2) \end{bmatrix}$$

The prototype signals can then be output to a covariance matrix estimator 803 and to a mixer 809.

In some embodiments the synthesis processor 509 is configured to estimate a covariance matrix of the time-frequency prototype signal and its overall energy estimate, in frequency bands. As earlier, the covariance matrix can be estimated as $$C_x(k, n) = \sum_{b=b_{k,low}}^{b_{k,high}} x(b, n)x^H(b, n).$$

The estimation of the covariance matrix may involve temporal averaging, such as IIR averaging or FIR averaging over several time indices n. The covariance matrix estimator 803 can also be configured to formulate an overall energy estimate E(k,n), that is the sum of the diagonal values of $C_x$(k,n). In some embodiments, instead of estimating the overall energy from the prototype signals, the overall energy estimate may be estimated based on the interpolated signals 512. For example, an overall energy estimate has already been determined in the signal interpolator shown in FIG. 5 and may be obtained from there.

The overall energy estimate 806 may be provided as an output to the target covariance matrix determiner 805. The estimated covariance matrix may be output to the mixing rule determiner 807.

The synthesis processor 509 may further comprise a target covariance matrix determiner 805. The target covariance matrix determiner 805 is configured to receive the interpolated spatial metadata 514 and the overall energy estimate E(k,n) 806. In this example, the spatial metadata includes azimuth θ'(k,n), elevation φ'(k,n) and a direct-to-total energy ratio r'(k,n). The target covariance matrix determiner 805 in some embodiments also receives the head orientation (yaw, pitch, roll) information 516.

In some embodiments the target covariance matrix determiner is configured to rotate the spatial metadata according to the head orientation by $$\begin{bmatrix} v_1'(k, n) \\ v_2'(k, n) \\ v_3'(k, n) \end{bmatrix} = \text{rotate}\left(\begin{bmatrix} \cos(\theta'(k, n))\cos(\varphi'(k, n)) \\ \sin(\theta'(k, n))\cos(\varphi'(k, n)) \\ \sin(\varphi'(k, n)) \end{bmatrix}, \text{yaw, pitch, roll}\right)$$

The rotated directions are then $$\theta''(k,n)=\text{atan2}(v'_2(k,n),v'_1(k,n))$$

$$\varphi''(k,n)=\text{atan2}\left(v'_3(k,n),\sqrt{v'_1(k,n)v'_1(k,n)+v'_2(k,n)v'_2(k,n)}\right)$$

The target covariance matrix determiner 805 may also utilize a HRTF (head-related transfer function) data set that pre-exists at the synthesis processor. It is assumed that from the HRTF set it is possible to obtain a 2×1 complex-valued head-related transfer function (HRTF) h(θ,φ,k) for any angle θ, φ and frequency band k. For example, the HRTF data may be a dense set of HRTFs that has been pre-transformed to the frequency domain so that HRTFs may be obtained at the middle frequencies of the bands k. Then, at the rendering time, the nearest HRTF pairs to the desired directions may be selected. In some embodiments, interpolation between two or more nearest data points may performed. Various means to interpolate HRTFs have been described in the literature.

At the HRTF data set also a diffuse-field covariance matrix has been formulated for each band k. For example, the diffuse-field covariance matrix may be obtained by taking an equally distributed set of directions $\theta_d$, $\varphi_d$ where d=1 . . . D, and by estimating the diffuse-field covariance matrix as $$C_D(k) = \frac{1}{D}\sum_{d=1}^{D} h(\theta_d, \varphi_d, k)h^H(\theta_d, \varphi_d, k).$$

The target covariance matrix determiner 805 may then formulate the target covariance matrix by $$C_y(k,n)=E(k,n)r(k,n)h(\theta''(k,n),\varphi''(k,n),k)h^H(\theta''(k,n),\varphi''(k,n),k)+E(k,n)(1-r(k,n))C_D(k)$$

The target covariance matrix $C_y$ (k,n) is then output to the mixing rule determiner 807.

In some embodiments the synthesis processor 509 further comprises a mixing rule determiner 807. The mixing rule determiner 807 is configured to receive the target covariance matrix $C_y$ (k,n), and the measured covariance matrix $C_x$(k,n) and generates a mixing matrix M(k,n). The mixing procedure may use the method described in Vilkamo, J., Bäckström, T. and Kuntz, A., 2013. Optimized covariance domain framework for time-frequency processing of spatial audio. Journal of the Audio Engineering Society, 61(6), pp. 403-411 to generate a mixing matrix.

The formula provided in the appendix of the above reference can be used to formulate a mixing matrix M(k,n). In the present invention report, we used for clarity the same notation for matrices. In some embodiments the mixing rule determiner 807 is also configured to determine a prototype matrix $$Q = \begin{bmatrix} 1 & 0 \\ 0 & 1 \end{bmatrix}$$

that guides the generation of the mixing matrix 812. The rationale of these matrices and the formula to obtain a mixing matrix M(k,n) based on them is described in detail in the above cited reference and is not repeated herein. In short, the method is such that provides a mixing matrix M(k,n) that when applied to a signal with a covariance matrix $C_x$(k,n) produces a signal with covariance matrix substantially the same as or similar to $C_y$ (k,n) in a least-squares optimized way. In these embodiments the prototype matrix Q is the identity matrix, since the generation of prototype signals has been already implemented by the prototype signal generator 801. Having an identity prototype matrix means that the processing aims to produce an output that is as similar as possible to the input (i.e., with respect to the prototype signals) while obtaining the target covariance matrix $C_y$(k,n). The mixing matrix M(k,n) 812 is formulated for each frequency band k and is provided to the mixer.

The synthesis processor 509 in some embodiments comprises a mixer 809. The mixer 809 is configured to receive the time-frequency prototype audio signals 802 and the mixing matrices 812. The mixer 809 processes the input prototype signal 802 to generate two processed (binaural) time-frequency signals 814.

$$y(b, n) = \begin{bmatrix} y_1(b, n) \\ y_2(b, n) \end{bmatrix} = M(k, n)x(b, n)$$

where bin b resides in band k.

The above procedure assumes that the input signals x(b,n) had suitable incoherence between them to render an output signal y(b,n) with the desired target covariance matrix properties. It is possible in some situations that the input signal does not have suitable inter-channel incoherence. In these situations, there is a need to utilize decorrelating operations to generate decorrelated signals based on x(b,n), and to mix the decorrelated signals into a particular residual signal that is added to the signal y(b,n) in the above equation. The procedure of obtaining such a residual signal has been explained in the earlier cited reference.

The mixer 809 is then configured to output the processed binaural time-frequency signal y(b,n) 814 is provided to an inverse T/F transformer 811.

The synthesis processor 509 in some embodiments comprises an inverse T/F transformer 811 which applies an inverse time-frequency transform corresponding to the applied time-frequency transform, such as an inverse STFT in case the signals are in the STFT domain to the processed binaural time-frequency signal 814 to generate a spatialized audio output 518, which may be in a binaural form that may be reproduced over the headphones.

Figure 9:
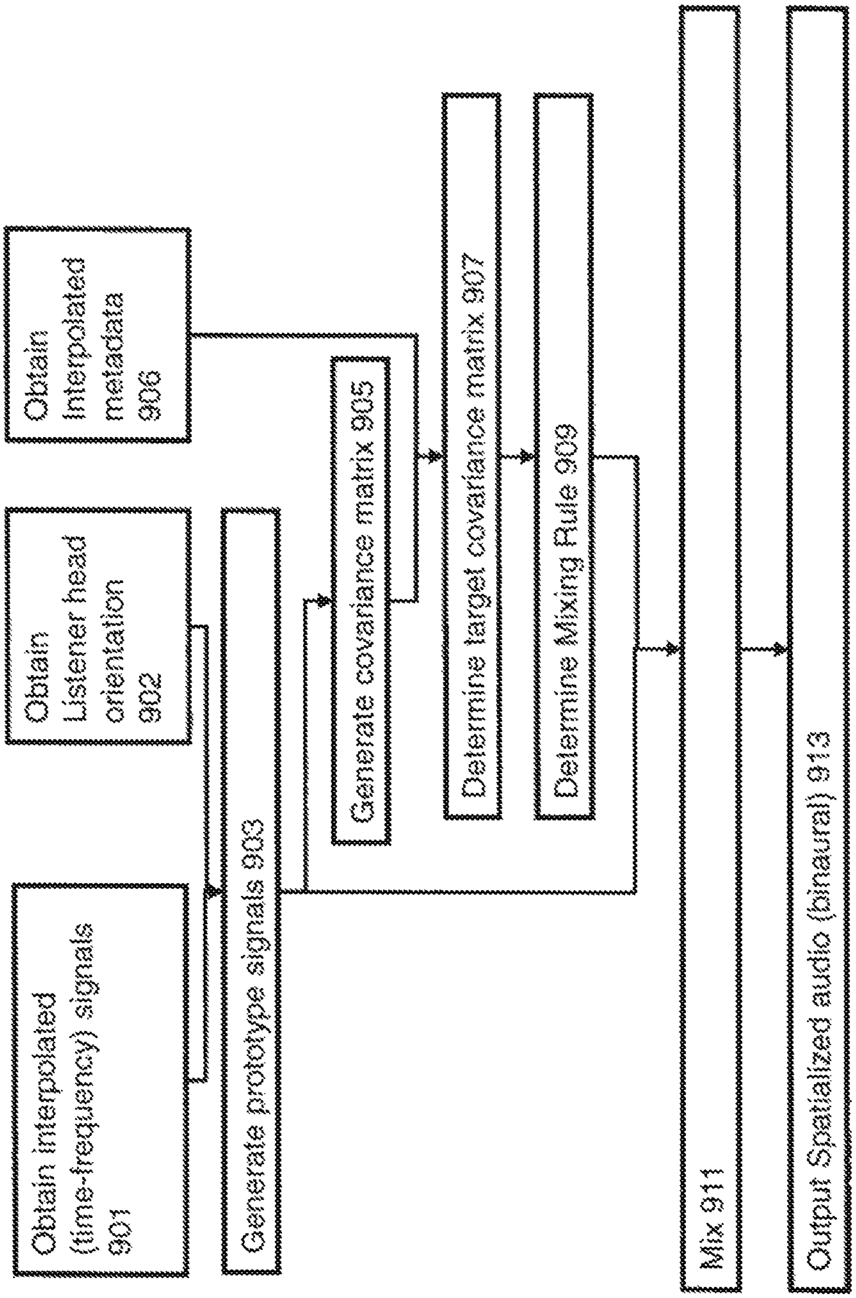
FIG. 9 shows a flow diagram of the operations of the synthesis processor shown in FIG. 5 according to some embodiments.

The operations of the synthesis processor shown in FIG. 8 are shown with respect to the flow diagram of FIG. 9.

Thus the method comprises obtaining interpolated (time-frequency) signals as shown in FIG. 9 by step 901.

Furthermore are obtained listener head orientation as shown in FIG. 9 by step 902.

Then based on the interpolated (time-frequency) signals and head orientation prototype signals are generated as shown in FIG. 9 by step 903.

Additionally the covariance matrix is generated based on the prototype signal as shown in FIG. 9 by step 905

Furthermore there may be obtained interpolated metadata as shown in FIG. 9 by step 906.

Based on the interpolated metadata and covariance matrix a target covariance matrix is determined as shown in FIG. 9 by step 907.

A mixing rule can then be determined as shown in FIG. 9 by step 909.

Based on the mixing rule and the prototype signals a mix can be generated as shown in FIG. 9 by step 911 to generate the spatialized audio signals.

Then the spatialized audio signals may be output as shown in FIG. 9 by step 913.

Figure 10:
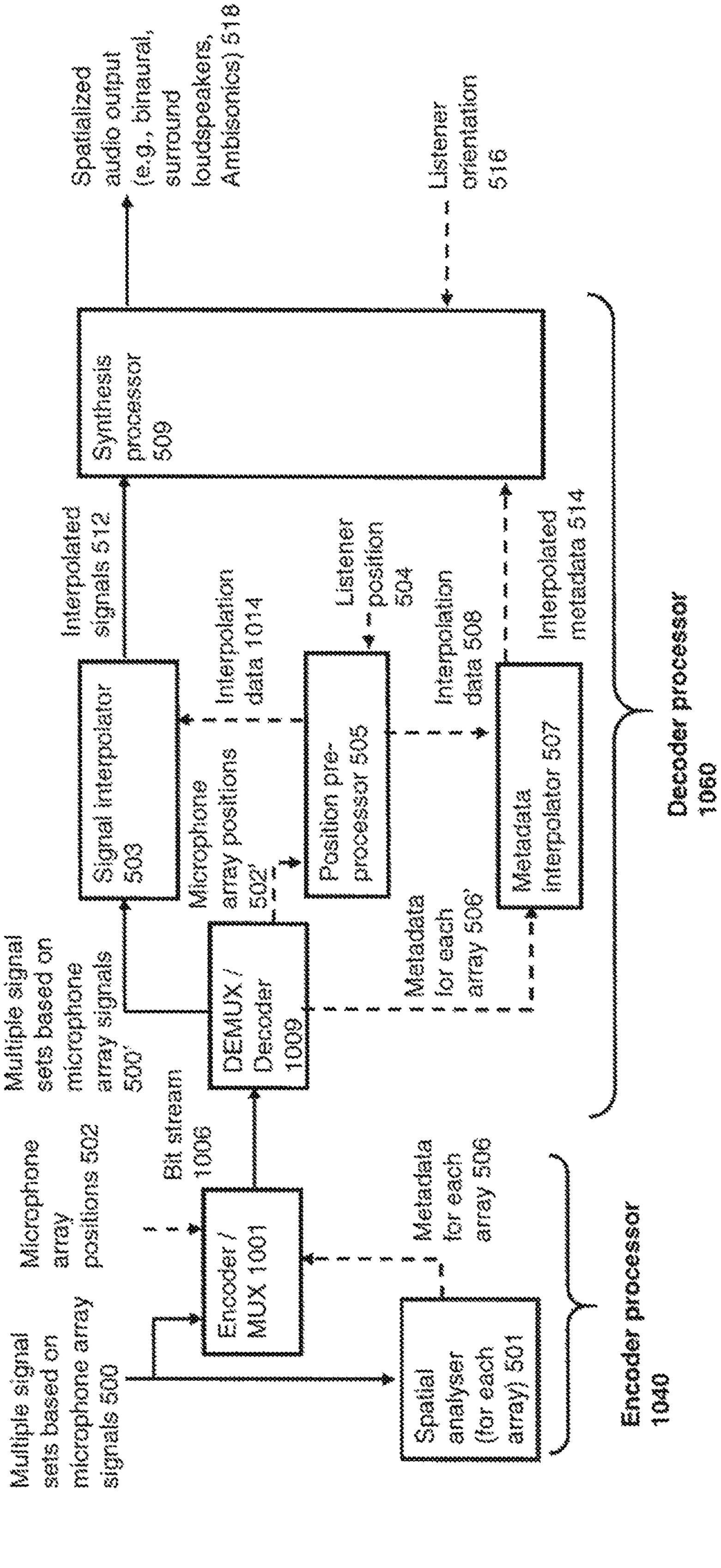
FIG. 10 shows schematically suitable apparatus for implementing interpolation of audio signals and metadata according to some embodiments.

Some further embodiments are shown in FIG. 10. In these embodiments the system is as in FIG. 5, except that the system is implemented in two separate apparatus, the encoder processor 1040 and the decoder processor 1060 and the addition of the Encoder/MUX 1001 and DEMUX/Decoder 1009.

In these embodiments the encoder processor 1040 is configured to receive as inputs the multiple signal sets 500 and the microphone array positions 502. The encoder processor 1040 furthermore comprises the spatial analyser 501 configured to receive the multiple signal sets 500 and output the metadata for each array 506. The encoder processor 1040 also comprises an Encoder/MUX 1001 configured to receive the multiple signal sets 500, the metadata for each array 506 (from the spatial analyser 501) and the microphone array positions 502. The Encoder/MUX 1001 is configured to apply a suitable encoding scheme for the audio signals, for example, any methods to encode Ambisonic signals that have been described in context of MPEG-H. The encoder/MUX 1001 block may also downmix or otherwise reduce the number of audio channels to be encoded. Furthermore, the Encoder/MUX 1001 may quantize and encode the spatial metadata and the array position information and embed the encoded result to a bit stream 1006 along with the encoded audio signals. The bit stream 1006 may further be provided at the same media container with encoded video signals. The Encoder/MUX 1001 then outputs the bit stream 1006.

Depending on the employed bit rate, the encoder may have omitted the encoding of some of the signal sets, and if that is the case, it may have omitted encoding the corresponding array positions and metadata (however, they may also be kept in order to use them for metadata interpolation).

The decoder processor 1060 comprises a DEMUX/Decoder 1009. The DEMUX/Decoder 1009 is configured to receive the bit stream 1006 and decode and demultiplex the multiple signal sets based on microphone array 500' (and provides them to the signal interpolator 503), the microphone array positions 502' (and provides them to the position pre-processor 505) and the metadata for each array 506' (and provides them to metadata interpolator 507).

The decoder processor 1060 furthermore comprises the signal interpolator 503, the position pre-processor 505, the metadata interpolator 507 and the synthesis processor 509 as discussed in further detail with respect to FIG. 5 and FIG. 8.

In the above example, the information related to array positions is conveyed from the Encoder processor 1040 to the decoder processor 1060 via the bit stream 1006 but in some embodiments this may not be needed as the system may be configured so that the position pre-processor 505 is implemented within the encoder processor 1040. In such examples, the encoder processor is configured to generate the necessary interpolation data at a suitable grid of pre-defined expected user positions, for example, at a 10 cm spatial resolution. This interpolation data could be encoded using suitable means and provided to the decoder (to be decoded) in the bit stream. The interpolation data would then be used at the decoder processor 1060 as a lookup table based on the user position, by selecting the nearest existing data set corresponding to the user position.

Figure 11:
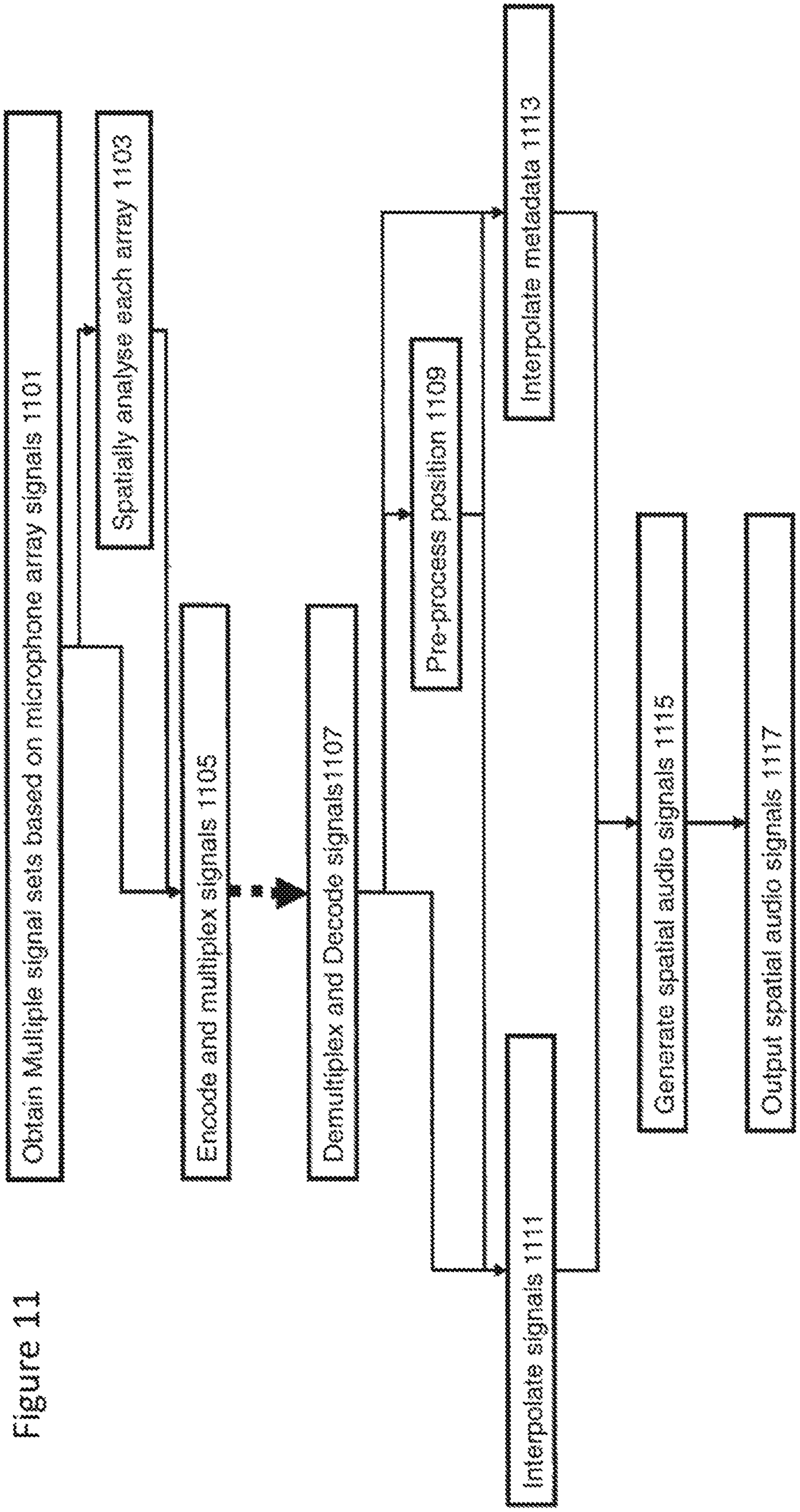
FIG. 11 shows a flow diagram of the operations of the apparatus shown in FIG. 5 according to some embodiments.

With respect to FIG. 11 is shown a flow diagram of the operations of the system as shown in FIG. 10.

The method may begin by obtaining the multiple signal sets based on microphone array signals as shown in FIG. 11 by step 1101.

The method may then comprise spatially analyzing the signal sets to generate spatial metadata as shown in FIG. 11 by step 1103.

The metadata, signals and other information may then be encoded and multiplexed as shown in FIG. 11 by step 1105.

The encoded and multiplexed signals and information may then be decoded and demultiplexed as shown in FIG. 11 by step 1107.

Having obtained the microphone array positions and listener orientations/positions then the method may obtain interpolation factors by processing the relative positions as shown in FIG. 11 by step 1109.

Having obtained the interpolation factors by processing the relative positions and the signals/metadata then the method may interpolate the signals as shown in FIG. 11 by step 1111 and interpolate the metadata as shown in FIG. 11 by step 1113.

Having determined the interpolated metadata and signals and the listener orientation/position then the method may apply synthesis processing as shown in FIG. 11 by step 1115.

The spatialized audio is output as shown in FIG. 11 by step 1117.

Figure 12:
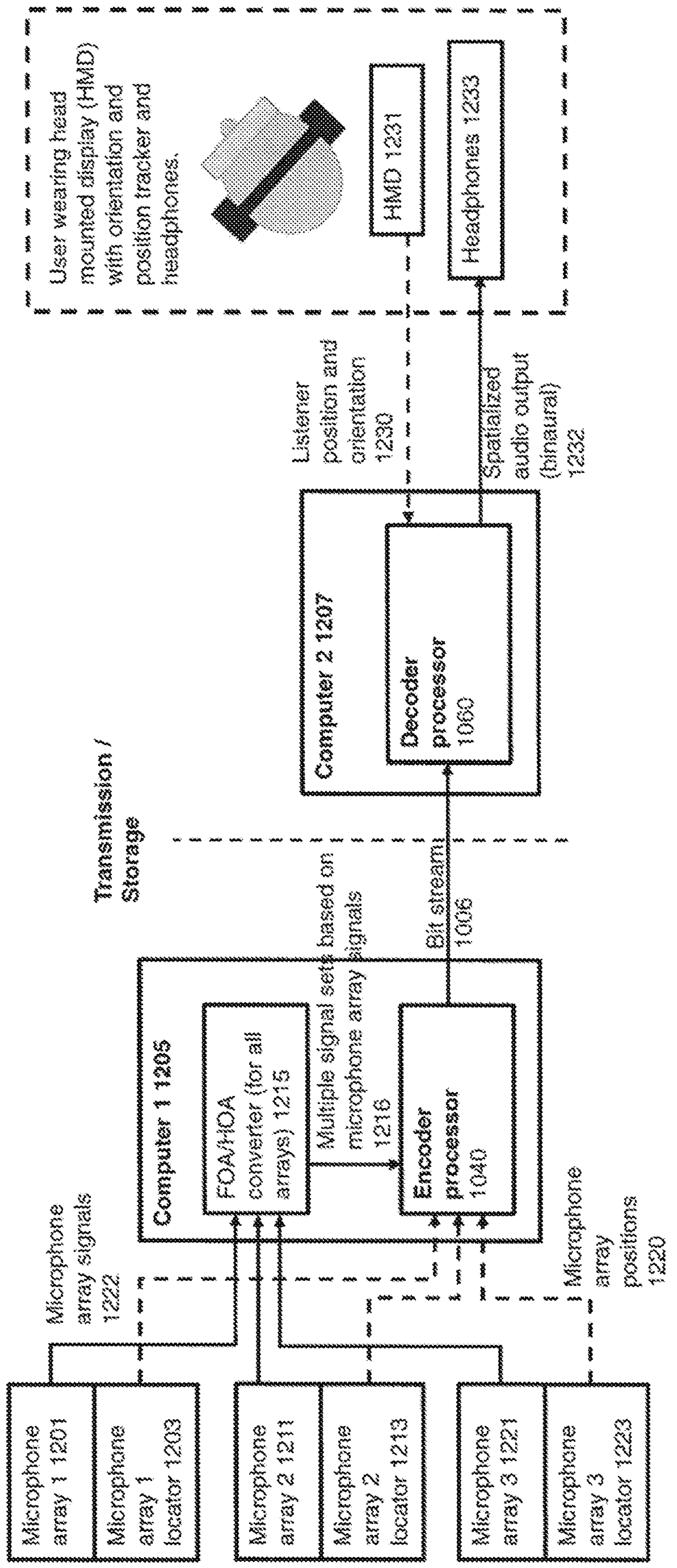
FIG. 12 shows schematically a further view of suitable apparatus for implementing interpolation of audio signals and metadata according to some embodiments.

With respect to FIG. 12 is shown an example application of the encoder and decoder processor of FIG. 10.

In this example, there are three microphone arrays, which could for example be spherical arrays with sufficient number of microphones (e.g., 30 or more), or VR cameras (e.g., OZO or similar) with microphones mounted on its surface. Thus is shown microphone array 1 1201, microphone array 2 1211 and microphone array 3 1221 configured to output audio signals to computer 1 1205 (and in this example FOA/HOA converter 1215).

Furthermore each array is equipped also with a locator providing the positional information of the corresponding array. Thus is shown microphone array 1 locator 1203, microphone array 2 locator 1213 and microphone array 3 locator 1223 configured to output location information to computer 1 1205 (and in this example encoder processor 1040).

The system in FIG. 12 further comprises a computer, computer 1 1205 comprising a FOA/HOA converter 1215 configured to convert the array signals to first-order Ambisonic (FOA) or higher-order Ambisonic (HOA) signals. Converting microphone array signals to Ambisonic signals is known and not described in detail herein but if the arrays were for example Eigenmikes, there are available means to convert the microphone signals to an Ambisonic form.

The FOA/HOA converter 1215 outputs the converted Ambisonic signals in the form of Multiple signal sets based on microphone array signals 1216, to the encoder processor 1040 which may operate as the encoder processor 1040 as described above.

The microphone array locator 1203, 1213, 1223 is configured to provide the Microphone array position information to the Encoder processor in computer 1 1205 through a suitable interface, for example, through a Bluetooth connection. In some embodiments the array locator also provides rotational alignment information, which could be provided to rotationally align the FOA/HOA signals at computer 1 1205.

The encoder processor 1040 at computer 1 1205 is configured to process the multiple signal sets based on microphone array signals and microphone array positions as described in context of FIG. 10 and provide the encoded bit stream 1006 as an output.

The bit stream 1006 may be stored and/or transmitted, and then the decoder processor 1060 of computer 2 1207 is configured to receive or obtain from the storage the bit stream 1006. The Decoder processor 1060 may also obtain listener position and orientation information from the position/orientation tracker of a HMD (head mounted display) 1231 that the user is wearing. Based on the bit stream 1006 and listener position and orientation information 1230, the decoder processor of computer 2 1207 is configured to generate the binaural spatialized audio output signal 1232 and provide them, via a suitable audio interface, to be reproduced over the headphones 1233 the user is wearing.

In some embodiments, computer 2 1207 is the same device as computer 1 1205, however, in a typical situation they are different devices or computers. A computer in this context may refer to a desktop/laptop computer, a processing cloud, a game console, a mobile device, or any other device capable of performing the processing described in the present invention disclosure.

In some embodiments, the bit stream 1006 is an MPEG-I bit stream. In some other embodiments, it may be any suitable bit stream.

In the above embodiments the spatial parametric analysis of Directional Audio Coding can be replaced by an adaptive beamforming approach. The adaptive beamforming approach may for example be based on the COMPASS method outlined in Archontis Politis, Sakari Tervo, and Ville Pulkki. "COMPASS: Coding and Multidirectional Parameterization of Ambisonic Sound Scenes." in IEEE Int. Conf, of Acoustics, Speech, and Signal Processing (ICASSP), 2018.

In such embodiments a spatial covariance matrix $C_{HoA,j}$(k,n) can be computed from the Ambisonic signals as defined before, but include higher-order Ambisonic (HOA) channels if available. For example the signals can be represented as $$s_j(b,n) = \begin{bmatrix} S_j(b,n,1) \\ \vdots \\ S_j(b,n,(N+1)^2) \end{bmatrix}$$

where N is the Ambisonic order. The spatial covariance matrix can in some embodiments be decomposed through an eigenvalue decomposition $$C_{HOA,j}(k,n)=E(k,n)V(k,n)E^H(k,n)$$

where E(k,n) contains the eigenvectors and V(k,n) contains the eigenvalues. A diffuse or non-diffuse condition determination can then be performed based on a statistical analysis of the ordered eigenvalues contained in the diagonal of V(k,n).

If non-diffuse conditions are detected, then the number S' of prominent sources is estimated, also based on a statistical analysis of the distribution of the ordered eigenvalues. For robust estimation the source number is bounded by $$S=\min(S',(N+1)^2/2).$$

After the estimation of the number of sources, their approximate directions-of-arrival (DOAs) are determined. For a dense precomputed grid of m=1, . . . , M directions ($\theta_m$, $\varphi_m$) arranged uniformly over the sphere, on the range of M=1000~5000 angles, a spatial power spectrum can be computed as $$p_j(k,n) = \begin{bmatrix} p_j(k,n,1) \\ \vdots \\ p_j(k,n,m) \\ \vdots \\ p_j(k,n,M) \end{bmatrix} = \begin{bmatrix} y_N^H(\theta_1,\phi_1)C_{HOA,j}(k,n)y_N(\theta_1,\phi_1) \\ \vdots \\ y_N^H(\theta_m,\phi_m)C_{HOA,j}(k,n)y_N(\theta_m,\phi_m) \\ \vdots \\ y_N^H(\theta_M,\phi_M)C_{HOA,j}(k,n)y_N(\theta_M,\phi_M) \end{bmatrix}$$

where $y_N$ is a vector of spherical harmonic values up to order N and with the appropriate ordering and normalization for the applied Ambisonic convention. The estimated DOAs then correspond to the grid directions with the S highest peaks.

In some other embodiments the DOA estimation can employ higher-resolution subspace methods especially at low Ambisonic orders, to overcome limitations of wide low-order beams distinguishing sources at close angles. For example, MUSIC can be used, where the spatial spectrum is computed as $$p_j(k,n,m) = \frac{1}{\left\| E_{noise}^H(k,n)y_N(\theta_m,\phi_m) \right\|}$$

where $E_{noise}$(k,n) is formed from the last $(N+1)^2-S$ ordered eigenvectors of E(k,n). After MUSIC is performed for all grid points, the DOAs are similarly found through peak finding of the S highest peaks.

After the DOAs ($\theta_s$, $\varphi_s$) with s=1, . . . , S have been determined, a per-source direct-to-total (DTR) energy ratio can be determined as $$r_{j,s}(k,n) = \frac{y_N^H(\theta_s,\phi_s)C_{HOA,j}(k,n)y_N(\theta_s,\phi_s)}{E_j(k,n)}$$

The source with the highest DTR can then be selected as the dominant source, and the respective parameters $r_{j,s}$(k,n), $\theta_s$(k,n), $\varphi_s$(k,n) are passed to the metadata interpolator, similar to the DirAC analysis above.

In some further embodiments instead of selecting a single dominant DOA and DTR, some or all detected DOAs and DTRs are passed to the metadata interpolator. In other words in some embodiments for each time-frequency tile there are multiple simultaneous directions and ratios.

Thus although the aforementioned embodiments discusses estimating one simultaneous direction estimate for each time-frequency interval in some embodiments multiple directions for each time-frequency tile can be estimated or otherwise determined.

For example the metadata interpolation principles described herein may be extended also for two or more simultaneous direction estimates (at each time-frequency interval) and corresponding two or more direct-to-total energy ratios. In this case, the interpolated metadata also contains two or more direction estimates.

The method implemented in some embodiments may, for example, be:

1) Formulate direction vectors from all involved direction parameters (and corresponding ratios) using means described in the foregoing.
2) Determine array that is nearest to the listener.
3) Select, from the nearest array, the direction vector that is the longest (i.e., its direct-to-total ratio is the largest).
4) For the remaining arrays involved at the interpolation, select those direction vectors (one for each array) that have the largest dot product with the selected vector of the nearest array.
5) Formulate a combined vector based on the selected vectors (of steps 3 and 4) and the interpolation weights (as described in the foregoing) and obtain based on it a direction and ratio (as described in the foregoing).
6) Discard those vector data selected to be used in the foregoing steps 3 and 4
7) If direction vectors still exist at the nearest array, repeat steps 3-6 to determine the next direction and its corresponding ratio, until the multitude of interpolated directions and ratios is obtained.

In some embodiments a minimum-distance assignment algorithm, such as the Hungarian algorithm, is used to pair the closest DOAs between the sets. Since the number of DOAs may vary between the microphones, the assignment may happen between equal number of DOAs for pairs of microphones, while additional DOAs that are unassigned in a certain microphone may be still interpolated with zero DOA vectors at the other microphones. With this approach, as many DOAs can be passed to the synthesis stage as the maximum number of detected DOAs across the three microphone arrays.

In some embodiments when there are multiple simultaneous directions of arrival, at target covariance matrix determiner 805 of the synthesis processor 509 shown in FIG. 8, the target covariance matrix is built with more than one direct parts (for each direction and its corresponding direct-to-total energy ratio). Otherwise the synthesis processing may be the same.

In some embodiments, the signal interpolator 503 as shown in FIG. 5, is configured to interpolate the audio signals using any suitable method. For example instead of switching the signals, the signals are linearly interpolated based on the weight factors ($w_1$, $w_2$, and $w_3$). In some circumstances this method of interpolation may cause undesired comb filtering, however, there may be some cases when it provides better quality.

In some embodiments, the interpolation data 508/510, microphone array positions 502, and/or listener position 504 are forwarded also to the synthesis processor 509. These may, for example, be used in the determination of the prototype signals (for example to use wider patterns when the listener is far away from any array in order to not lose any signal energy).

In some embodiments the functional or processing blocks described in the foregoing embodiments may be combined and/or divided into other functional or further processing blocks in various ways. For example, in some embodiments the functions (or the processing steps) associated with the signal interpolator 503, position pre-processor 505 and metadata interpolator 507 are integrated within the synthesis processor 509. In some embodiments combining the functionality (or processing steps) results in more compact code and efficient implementation.

In some embodiments, the prototype signals may already be determined in the signal interpolator 503. In such embodiments, the listener orientation 516 is supplied to the signal interpolator 503.

In some embodiments, the target total energy is determined in the signal interpolator 503 and passed to the synthesis processor 509. In these embodiments, the interpolated signals 512 S(b,n,i) may not need to be energy corrected in the signal interpolator 503, as the energy correction may be performed in the synthesis processor 509 (using the received target energies instead of the target energies determined based on the received audio signals). This may be beneficial in some practical systems, as energy correction can be performed simultaneously with the spatial synthesis, thus potentially reducing computation complexity. Moreover, these embodiments may feature an improved audio quality, as all the gains can be applied at the same time (and thus potential temporal gain smoothing can be applied only once).

In some embodiments, interpolation weights ($w_1$, $w_2$, and $w_3$) may be determined using any suitable scheme. For example in some embodiments the aforementioned embodiments may be tuned so that the closest array is used more prominently.

In the embodiments described herein the signal interpolator 503 is configured to determine the selected microphone array $j_{sel}$ so that it was always one of the microphone arrays $j_1$, $j_2$, $j_3$ inside which the listener position was. This determination, in some cases, may cause switching between two microphone arrays if the listener is on the edge of two determined triangles. In order the prevent this rapid switching, in some embodiments, a threshold value may be applied in the selection of the microphone array. For example the selected microphone array $j_{sel}$ is changed only if some of the microphone arrays $j_1$, $j_2$, $j_3$ is closer than $j_{sel}$ by a certain threshold.

In some embodiments, the parameter interpolation may be performed using a combination of different methods. For example two different methods for interpolating the direct-to-total energy ratio were presented above. In some embodiments, a combination of these methods may be implemented. For example if the first method (in other words the length of the combined vector) provides a value below a threshold, then the result of the first method is selected, and otherwise the result of the second method (in other words the weighting of the original ratios directly) is selected. The threshold may be fixed or adaptive. For example in some embodiments the threshold may be determined in relation to the original ratios.

In some embodiments discussed above there is provided an encoder and a decoder as shown in FIG. 10. In some other embodiments, the spatial analysis is performed in the decoder (at least at some frequencies). In these embodiments only the audio signals and the microphone positions need to be passed from the encoder to the decoder. In some embodiments the spatial metadata at some frequencies is also transferred.

As shown in FIG. 7, when the listener is outside of the region related to the microphone array positions, then the listener position can be projected to within that region. This means that when the user is slightly outside the region there may be a negligible directional bias due to the positional mismatch, but when the user would be far away of the region the bias may be large. As discussed above in practical situations it is unlikely that the user moves very far from the arrays (because of the need to also reproduce video), and therefore the perceptually adverse effects of such a bias are usually limited. However in some embodiments these effects can be furthermore mitigated, for example by modifying the ratio parameter indicating a more ambient sound when the user moves further from the region. In such embodiments, there may be a distance at which (and beyond which) the ratio parameter then indicates full ambience. The system is therefore at these situations configured to render the sound as a non-localizable sound instead of reproducing expectedly false directions.

In some embodiments, the signal interpolator 503, the sound scene energy at each microphone can be computed, instead of using the energy of the first channel only, from all the Ambisonic channels, including higher order ones, as $E_j(k,n)=\sum_{i=1}^{(N+1)^2} c_{i,i,j}(k,n)/(N+1)$ for the SN3D Ambisonic channel normalization convention, or $E_j(k,n)=\sum_{i=1}^{(N+1)^2} c_{i,i,j}(k,n)/(N+1)^2$ for the N3D Ambisonic channel normalization convention, where N is the Ambisonic order.

The above embodiments assume that the microphone arrays are positioned in the same orientation, or alternatively converted to the same orientation (in other words the “x-axis” of each microphone array are aligned and points in the same direction). In some embodiments the microphone array orientation information is conveyed in addition the position information. This information may then be used in any point of the processing in order to take the different orientations into account and ‘align’ the microphone orientations.

Figure 13:
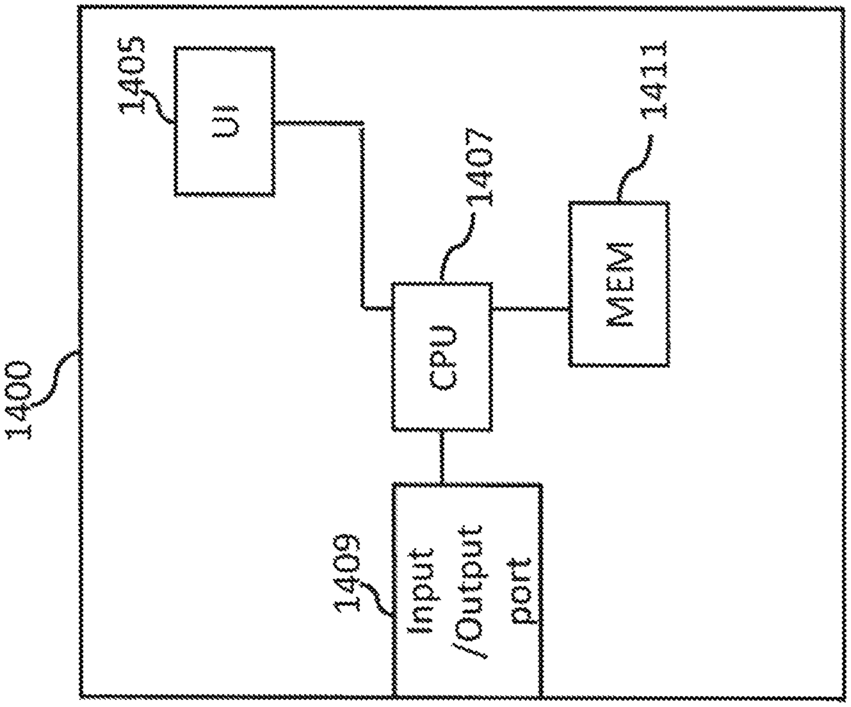
FIG. 13 shows schematically an example device suitable for implementing the apparatus shown.

With respect to FIG. 13 an example electronic device which may be used as the computer, encoder processor, decoder processor or any of the functional blocks described herein is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to transmit/receive the audio signals, the bitstream and in some embodiments perform the operations and methods as described above by using the processor 1407 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one storing instruction that, when executed with the at least one processor, cause the apparatus at least to:

obtain two or more audio signal sets, based on microphone array signals, wherein the two or more audio signal sets are respectively associated with a position;

obtain at least one spatial metadaata parameter for at least two of the two or more audio signal sets;

obtain the positions associated with at least the at least two audio signal sets;

obtain a listener position;

generate at least one audio signal based on at least one audio signal from at least one of the two or more audio signal sets based on the positions associated with at least the at least two of the audio signal sets and the listener position;

generate at least one modified spatial metadata parameter based on the obtained at least one spatial metadata parameter for the at least two of the audio signal sets, the positions associated with the at least two of the audio signal sets and the listener position; and process the at least one audio signal based on the at least one modified spatial metadata parameter to generate a spatial audio output.

2. The apparatus as claimed in claim 1, wherein the at least one memory stores instructions that, when executed with the at least one processor, cause the apparatus at least to:

obtain the two or more audio signal sets from microphone arrangements, wherein the microphone arrangements are at respective positions and respectively comprise one or more microphones.

3. The apparatus as claimed in claim 1, wherein the two or more audio signal sets are respectively associated with an orientation and the at least one memory stores instructions that, when executed with the at least one processor, cause the apparatus to:

obtain the orientations of the two or more audio signal sets, wherein the generated at least one audio signal is further based on the orientations associated with the two or more audio signal sets, and wherein the at least one modified spatial metadata parameter is further based on the orientations associated with the two or more audio signal sets.

4. The apparatus as claimed in claim 1, wherein the at least one memory stores instructions that, when executed with the at least one processor, cause the apparatus to:

obtain a listener orientation, wherein the at least one modified spatial metadata parameter is further based on the listener orientation.

5. The apparatus as claimed in claim 4, wherein processing the at least one audio signal based on the at least one modified spatial metadata parameter to generate the spatial audio output comprises the at least one memory stores instructions that, when executed with the at least one processor, cause the apparatus to:

process the at least one audio signal further based on the listener orientation.

6. The apparatus as claimed in claim 1, wherein the at least one memory stores instructions that, when executed with the at least one processor, cause the apparatus to:

obtain control parameters based on the positions associated with the at least two of the audio signal sets and the listener position, and wherein at least one of the generated at least one audio signal or the generated at least one modified spatial metadata parameter is controlled based on the control parameters.

7. The apparatus as claimed in claim 6, wherein the at least one memory stores instructions that, when executed with the at least one processor, cause the apparatus to at least one of:

identify at least three of the audio signal sets within which the listener position is located and generate weights associated with the at least three of the audio signal sets based on the audio signal set positions and the listener position; or identify two of the audio signal sets closest to the listener position and generate weights associated with the two of the audio signal sets based on the audio signal set positions and a perpendicular projection of the listener position from a line between the two of the audio signal sets.

8. The apparatus as claimed in claim 7, wherein the at least one memory stores instructions that, when executed with the at least one processor, cause the apparatus to one of:

combine two or more audio signals from the two or more audio signal sets based on at least one of: the weights associated with the at least three of the audio signals sets, or the weights associated with the two of the audio signal sets;

select one or more audio signals from one of the two or more audio signal sets based on which of the two or more audio signal sets is closest to the listener position; or select one or more audio signals from the one of the two or more audio signal sets based on which of the two or more audio signal sets is closest to the listener position and a further switching threshold.

9. The apparatus as claimed in claim 7 the at least one memory stores instructions that, when executed with the at least one processor, cause the apparatus to:

combine the obtained at least one spatial metadata parameter for at least two of the two or more audio signal sets based on at least one of: the weights associated with the at least three of the audio signals sets, or the weights associated with the two of the audio signal sets.

10. The apparatus as claimed in claim 1, wherein the at least one memory stores instructions that, when executed with the at least one processor, cause the apparatus to:

generate at least one of:

a binaural audio output comprising two audio signals for headphones and/or earphones; or a multichannel audio output comprising at least two audio signals for a multichannel speaker set.

11. The apparatus as claimed in claim 1, wherein at least one spatial metadata parameter comprises at least one of:

at least one direction;

at least one direct-to-total ratio associated with at least one direction value;

at least one spread coherence associated with at least one direction value;

at least one distance associated with at least one direction value;

at least one surround coherence;

at least one diffuse-to-total ratio; or at least one remainder-to-total ratio.

12. The apparatus as claimed in claim 1, wherein at least two of the audio signal sets comprises at least two audio signals, and the at least one memory stores instructions that, when executed with the at least one processor, cause the apparatus to:

spatially analyse the two or more audio signals from the two or more audio signal sets to determine the at least one spatial metadata parameter.

13. The apparatus as claimed in claim 1, wherein the at least one memory stores instructions that, when executed with the at least one processor, cause the apparatus to:

receive or retrieve the at least one spatial metadata parameter for at least two of the audio signal sets.

14. A method comprising:

obtaining two or more audio signal sets based on microphone array signals, wherein the two or more audio signal sets are respectively associated with a position;

obtaining at least one spatial metadata parameter for at least two of the two or more audio signal sets;

obtaining the positions associated with at least the at least two audio signal sets;

obtaining a listener position;

generating at least one audio signal based on at least one audio signal from at least one of the two or more audio signal sets based on the positions associated with at least the at least two of the audio signal sets and the listener position;

generating at least one modified spatial metadata parameter based on the obtained at least one spatial metadata parameter for the at least two of the audio signal sets, the positions associated with the at least two of the audio signal sets and the listener position; and processing the at least one audio signal based on the at least one modified spatial metadata parameter to generate a spatial audio output.

15. The method as claimed in claim 14, wherein obtaining two or more audio signal sets comprises:

obtaining the two or more audio signal sets from microphone arrangements, wherein the microphone arrangements are at respective positions and respectively comprise one or more microphones.

16. The method as claimed in claim 14, wherein the two or more audio signal sets are respectively associated with an orientation and the method further comprises:

obtaining the orientations of the two or more audio signal sets, wherein the generated at least one audio signal is further based on the orientations associated with the two or more audio signal sets, and wherein the at least one modified spatial metadata parameter is further based on the orientations associated with the two or more audio signal sets.

17. The method as claimed in claim 14, further comprising:

obtaining a listener orientation, wherein the at least one modified spatial metadata parameter is further based on the listener orientation.

18. The method as claimed in claim 17, wherein the processing of the at least one audio signal based on the at least one modified spatial metadata parameter to generate the spatial audio output further comprises:

processing the at least one audio signal further based on the listener orientation.

19. The method as claimed in claim 14, further comprising:

obtaining control parameters based on the positions associated with the at least two of the audio signal sets and the listener position, wherein generating at least one of the at least one audio signal or the at least one spatial metadata parameter is controlled based on the control parameters.

20. The method as claimed in claim 14, wherein at least two of the audio signal sets comprises at least two audio signals, and obtaining the at least one spatial metadata parameter comprises:

spatially analysing the two or more audio signals from the two or more audio signal sets to determine the at least one spatial metadata parameter.

* * * * *